US009357749B2

(12) United States Patent
Courtemanche

(10) Patent No.: US 9,357,749 B2
(45) Date of Patent: Jun. 7, 2016

(54) ROTARY MILKING STATION, KIT FOR ASSEMBLING THE SAME, AND METHODS OF ASSEMBLING AND OPERATING ASSOCIATED THERETO

(75) Inventor: Alain Courtemanche, Lefebvre (CA)

(73) Assignee: GEA HOULE INC., Drummondville (Quebec) (CA)

( * ) Notice: Subject to any disclaimer, the term of this patent is extended or adjusted under 35 U.S.C. 154(b) by 755 days.

(21) Appl. No.: 13/390,048

(22) PCT Filed: Jan. 31, 2011

(86) PCT No.: PCT/CA2011/000130
§ 371 (c)(1),
(2), (4) Date: Apr. 27, 2012

(87) PCT Pub. No.: WO2011/091530
PCT Pub. Date: Aug. 4, 2011

(65) Prior Publication Data
US 2012/0204797 A1  Aug. 16, 2012

Related U.S. Application Data

(60) Provisional application No. 61/299,796, filed on Jan. 29, 2010, provisional application No. 61/390,436, filed on Oct. 6, 2010.

(51) Int. Cl.
*A01K 1/12* (2006.01)
*F16C 19/30* (2006.01)

(52) U.S. Cl.
CPC *A01K 1/126* (2013.01); *F16C 19/30* (2013.01)

(58) Field of Classification Search
CPC .................................................. A01K 1/126
USPC .......................................... 119/14.04, 14.03
IPC .......................................................... A01K 1/12
See application file for complete search history.

(56) References Cited

U.S. PATENT DOCUMENTS

| 3,759,225 | A | * | 9/1973 | Galbraith | 119/14.04 |
| 3,972,379 | A | * | 8/1976 | Norris | 180/234 |
| 5,782,738 | A | | 7/1998 | Bowers | |
| 6,189,288 | B1 | * | 2/2001 | Bowers | 52/742.14 |
| 2009/0183687 | A1 | * | 7/2009 | Oliver | 119/14.04 |
| 2009/0184487 | A1 | * | 7/2009 | Kircher | 280/166 |

FOREIGN PATENT DOCUMENTS

| FR | 2 935 225 A1 | 3/2010 | |
| WO | WO 2007117162 A2 * | 10/2007 | A01K 1/12 |
| WO | WO 2010/062192 A2 | 6/2010 | |

* cited by examiner

*Primary Examiner* — Shadi Baniani
(74) *Attorney, Agent, or Firm* — McDermott Will & Emery LLP

(57) ABSTRACT

A rotary milking station (1) for milking cows and the like, the rotary milking station (1) including a base (3) having a circular path (5) disposed about a given center (7). The rotary milking station (1) also includes a driving assembly (9) operatively mountable onto the base (3) so as to be disposed about the circular path (5) of the base (3). The rotary milking station (1) also includes a carrousel (11) operatively mountable onto the driving assembly (9), the carrousel (11) being made out of sectional segments (13), each sectional segment (13) having a lower protruding vertical portion (15) and a pair of flange portions (17a, 17b) each projecting from a corresponding side of the vertical portion (15), the sectional segments (13) being interconnected to another so as to define the carrousel (11), the vertical portions (15) of the sectional segments (13) being positioned, shaped and sized so as to be disposed along the circular path (5) of the base (3) and for cooperating with the driving assembly (9) in order to enable the carrousel (11) to be rotatably moveable with respect to the base (3).

68 Claims, 44 Drawing Sheets

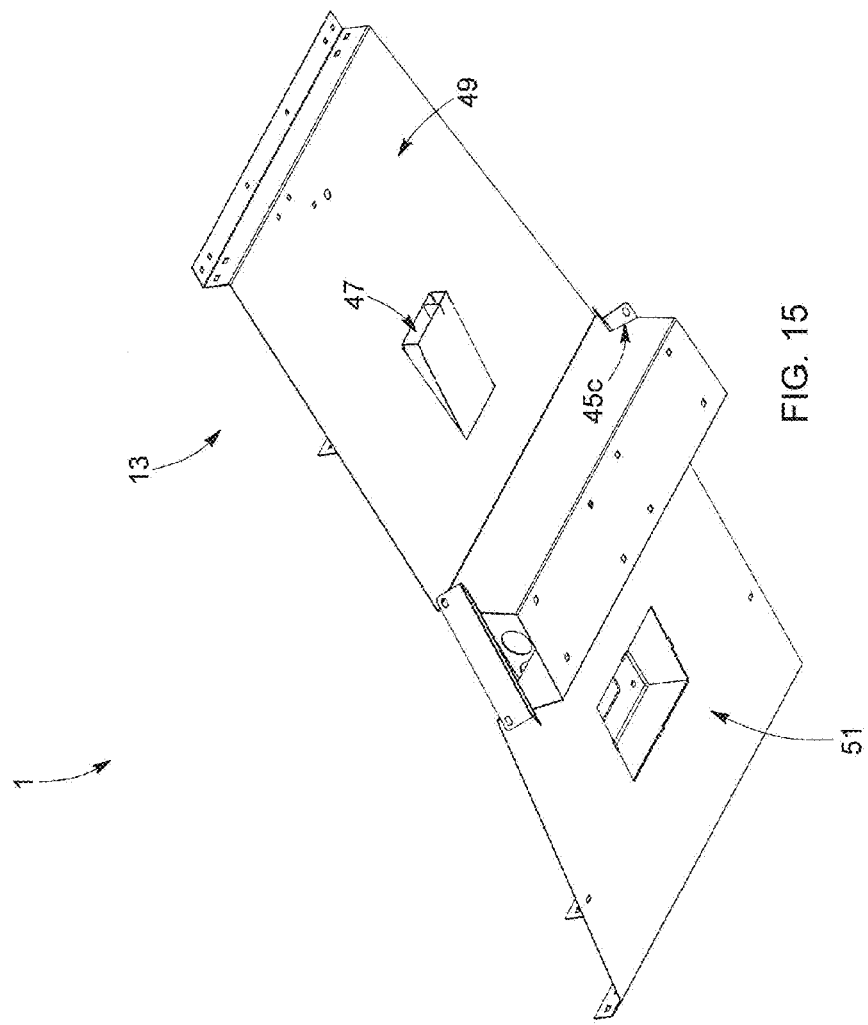

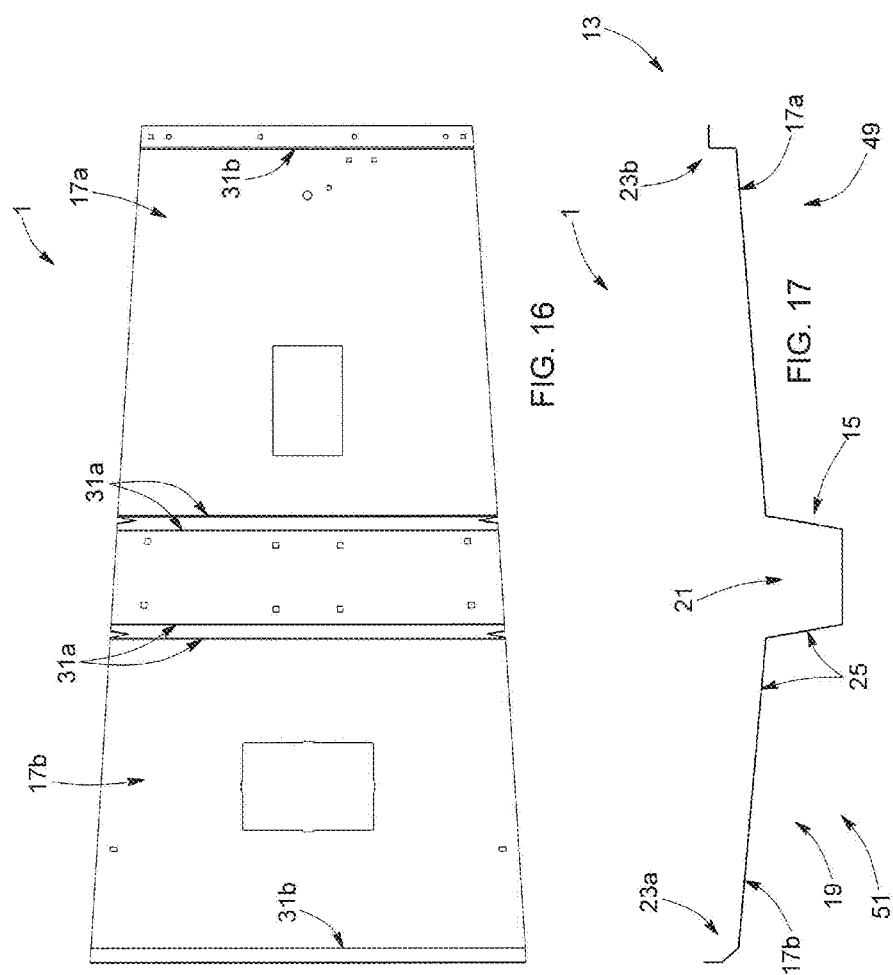

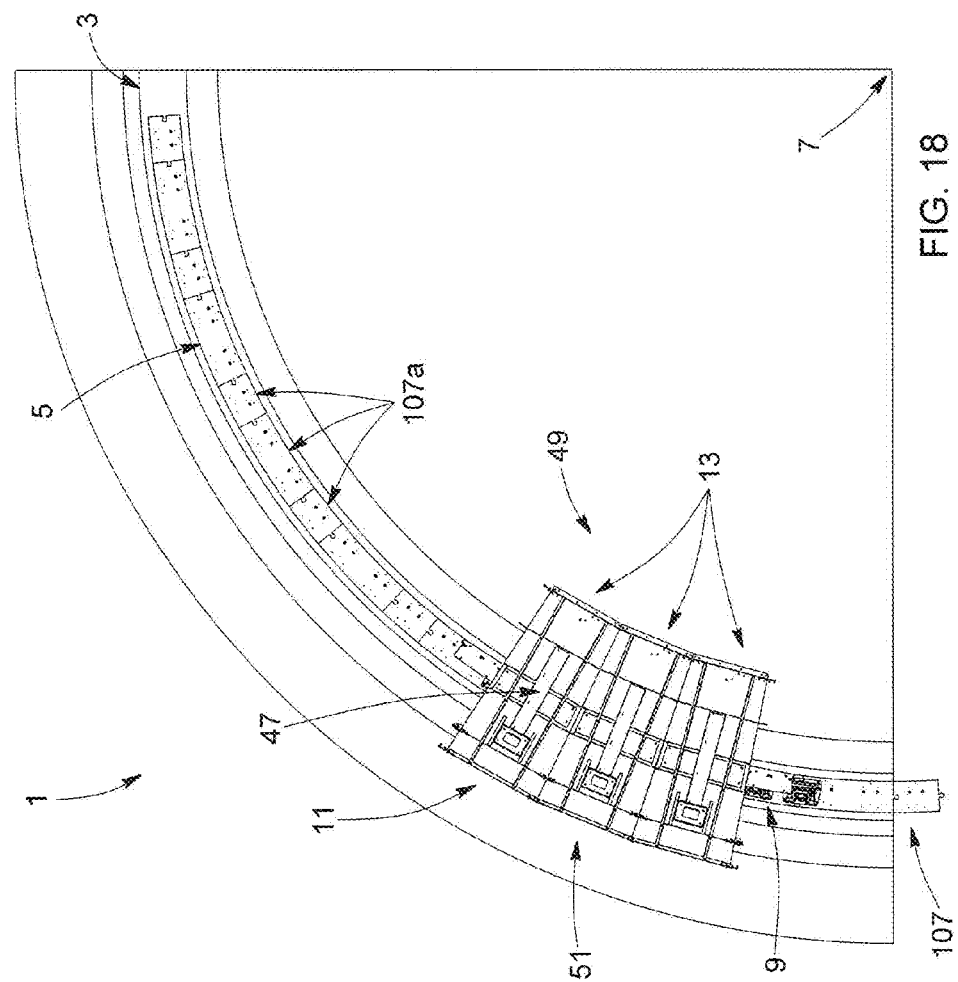

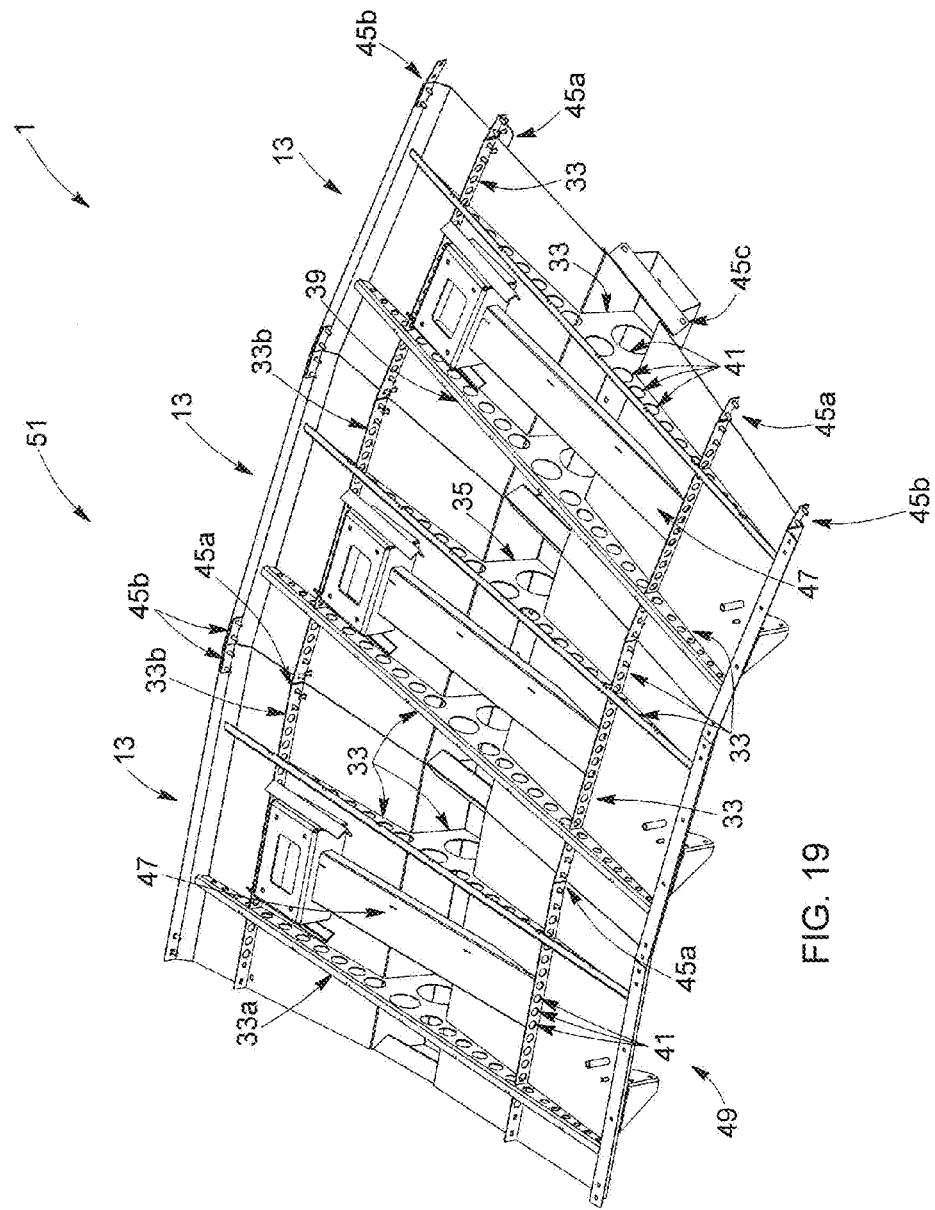

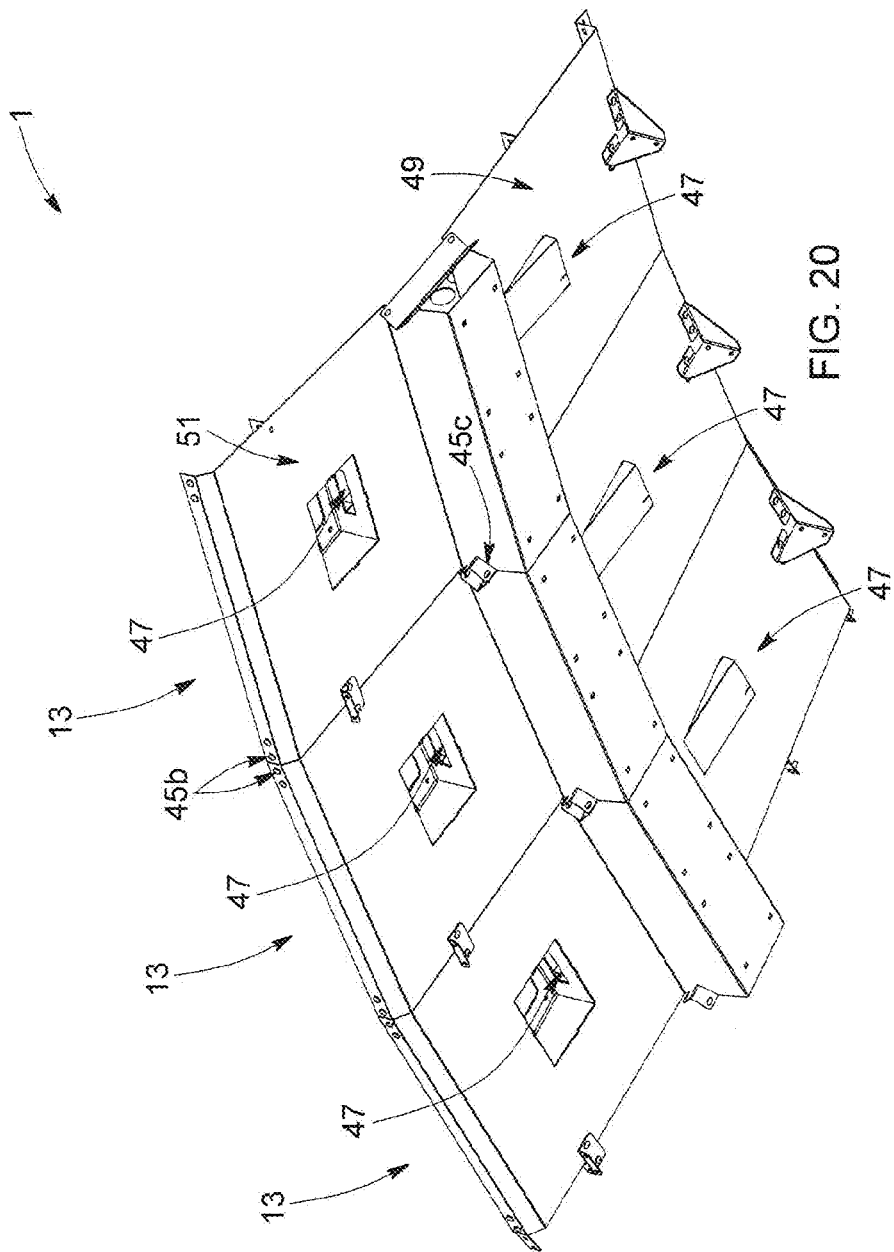

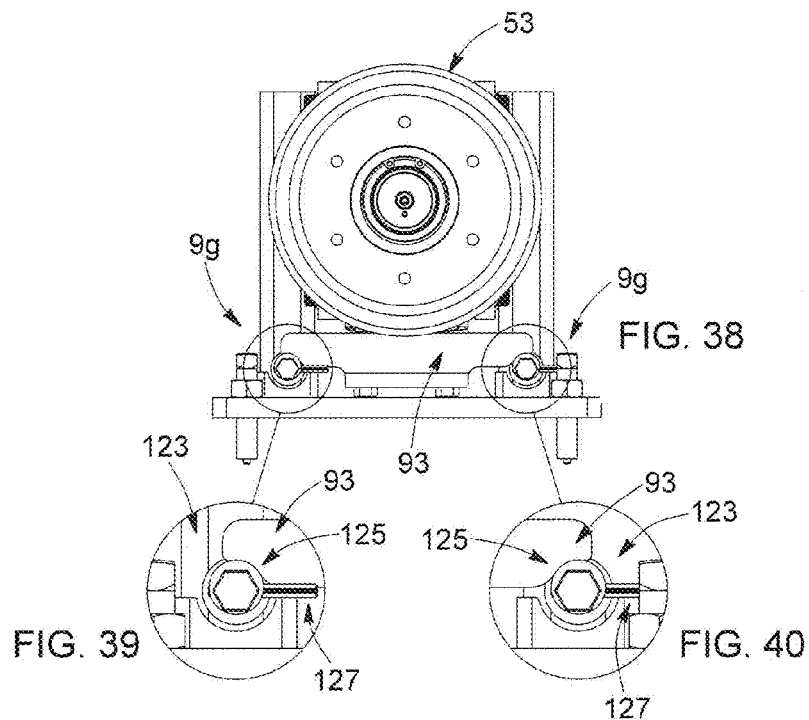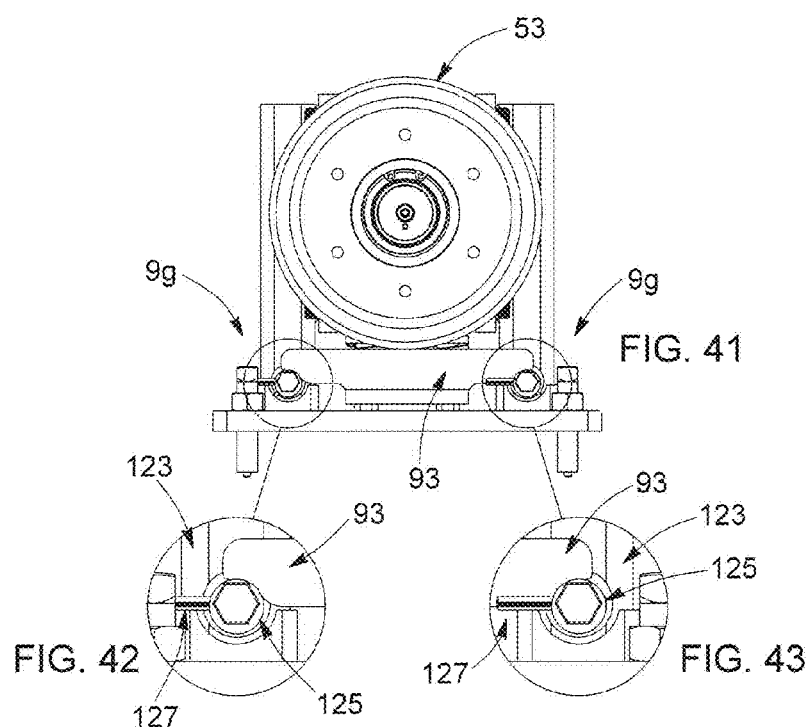

ROTARY MILKING STATION, KIT FOR ASSEMBLING THE SAME, AND METHODS OF ASSEMBLING AND OPERATING ASSOCIATED THERETO

This application is the U.S. National Phase under 35 U.S.C. §371 of International Application No. PCT/CA2011/000130, filed on Jan. 31, 2011, which in turn claims the benefit of U.S. Provisional Application Nos. 61/299,796, filed on Jan. 29, 2010 and 61/390,436, filed on Oct. 6, 2010, the disclosures of which Applications are incorporated by reference herein.

FIELD OF THE INVENTION

The present invention relates to a milking station. More particularly, the present invention relates to a rotary milking station, to a kit for assembling the same, to a plant provided with such a milking station, and to corresponding methods of assembling and operating associated thereto.

BACKGROUND OF THE INVENTION

Milking stations are well known in the art. For example, one may consult the following site: http://en.wikipedia.org/wiki/Dairy farming or a corresponding user's manual such as the "*WestfaliaSurge for milking rotary parlor*" (see FIGS. 4-7, for example).

Indeed, it is well known in the art that for several years now, cows having been treated or milked on mechanical rotary milking stations, also known as "carousels" or "parlors", similar to what is done in a production line. Typically, cows are treated by lots of about 20 to 100 cows, and in some cases, up to about 200 cows. With a load reaching approximately 3,500 pounds per cow on a very imposing carousel, several technological challenges present themselves in the conception of a new assembly which is meant to be as simple and as functional as possible.

Concerning existing technologies, it is known that a typical carousel will be generally made of three (3) main sections. Firstly, there is the structure which is intended to receive the overall assembly, and which is generally made of concrete, and there is also a fixed base of the carousel, which is intended to receive a rotary section. Therefore, and secondly, there is also a rotary system which is typically made of wheels, and thirdly, and lastly, there is the rotary section of the carousel.

Generally, a milking carousel and the structure which supports it are typically made of several I-beams, which are curved in order to form a circle in the most accurate manner possible. A point of reference is then installed at the center of the working site and the structure is assembled on location by positioning oneself with respect to the reference point. For example, FIG. 1 shows a perspective view of a base, wheels and an upper portion of the rolling system according to the prior art.

Once the structure has been assembled, a casing is built on the carousel. This casing will be filled with concrete to form a complete and rigid structure which is capable of supporting the weight of all the cows to be treated with the milking station. For example, FIG. 2 shows a carousel before the installation of reinforcements (bars, etc.) and pouring of concrete according to the prior art.

Between each of two portions of the milking station, the rotation is ensured by the presence of rollers, which are typically evenly spaced. The rotational axle of each roller ends up in a central point, which is the same as the center of the curved I-beams constituting each of the sections (i.e. base and carousel). For example, FIGS. 3*a* and 3*b* show different views of wheels constituting a carousel according to the prior art.

The carousel is then driven by a system generating a force between the lower structure (i.e. fixed base) and the upper structure (i.e. rotary section of the carousel). For example, FIG. 8 shows a perspective view of a driving system assembly according to the prior art, whereas FIG. 9 shows an example of a drive installed on an existing rotary parlor, and FIG. 10 shows an example of a drive installed on an existing rotary parlor according to the prior art.

Because the above-described manner of designing, assembling and operating a milking station is considered to be the "standard" in this industry, several problems and drawbacks are associated to this conventional manner of doing things.

For example, several drawbacks are associated with regards to the precision of the assembled structure. Namely, the beams cannot be machined to perfection. Furthermore, there is no room for adjustment. Moreover, the initial tolerances or errors of the raw material (e.g. steel beams) are initially very high. Furthermore, the tolerances are very important. In addition, further to the dimensions of the initial material, the assembling thereof adds its proper degree of errors or tolerances. Furthermore, the tolerances (i.e. errors) from the lower sections add themselves to those of the upper ones which are installed thereon, doubling the uncertainty of the overall assembly. Furthermore, the bed does often not rest centered, or is often not stable. Even during the assembling of the sectional beams forming the carousel, it is difficult to roll and curve the rails in a constant manner.

Other drawbacks associated to the precision of the assembled structure reside in the fact that during delivery, several beams do not end up having the dimensions that they had originally when coming out of the manufacturing plant. Indeed, it is well known in the art that transportation affects the curvature of beams. Furthermore, the assembling of structures via corresponding beams is very tedious and there is always a lot of room for error because of the intricate nature of the assembly. Furthermore, the dimensions of the beams and corresponding tolerances or errors add to the complication of the problem in that several rollers do not support a corresponding load when necessary, due to possible deviations in the carrousel and under considerations.

Other drawbacks and inconveniences associated to the aforementioned conventional manner of building milking stations also reside in the alignment of the rollers. Indeed, the rollers are not guided to perfection and are urged to continually come out of their course of travel. Furthermore, and typically, a roller will tend to flatten itself and its axle is generally not maintained centered with the center of the carousel. Moreover, by virtue of its conception and operation, the carousel always is urged to go in one way which is not a natural direction, thus creating a lot of mechanical resistance and wear, thereby not only increasing energy required to keep it in motion, but also very often, generating unwanted noise which is undesirable for the cows to be milked with the rotary milking station.

Other drawbacks and inconveniences associated to the above-described conventional milking stations reside in the loading of the rollers. Indeed, when the loads are not distributed correctly, several rollers no longer support the load, leaving the other rollers to pick up an additional load which further contributes to significant problems of wear (inconsistency and a much higher load per wheel if the distribution is not adequate). This substantial problem considerably increases maintenance frequencies and corresponding associated costs.

Other drawbacks and inconveniences associated to the above-described conventional milking stations reside in the fact that more engagement power is required to compensate for the drag created by non-optimal cooperation between base and carrousel.

Other drawbacks and inconveniences associated to the above-described conventional milking stations reside in the fact that the installation and construction of a typical milking parlor on a customer's site according to the prior art is really long, taking several weeks and even months. This long installation time creates important problems (e.g. downtime, etc.) and loss of production for the customer waiting for a milking method transition.

Other drawbacks and inconveniences associated to the above-described conventional milking stations reside in the fact that adjustment and maintenance of the driving and/or wheel systems is difficult and needs a complete shutdown of the overall system for a long period of time. In some cases, it is often impossible for customers to take care of such adjustment and maintenance, and thus, specialized assistance or equipment is required, along with unwanted associated costs.

Hence, in light of the aforementioned, there is a need for an improved system which, by virtue of its design and components, would be able to overcome or at least minimize some of the aforementioned prior art problems.

SUMMARY OF THE INVENTION

The object of the present invention is to provide a milking station which satisfies some of the above-mentioned needs and which is thus an improvement over other related milking stations and/or methods known in the prior art.

In accordance with the present invention, the above object is achieved, as will be easily understood, with a milking station such as the one briefly described herein and such as the one exemplified in the accompanying drawings.

More particularly, according to one aspect of the present invention, there is provided a rotary milking station for milking applications, the rotary milking station comprising:

a base having a circular path disposed about a given center;

a driving assembly operatively mountable onto the base so as to be disposed about the circular path of the base; and a carrousel operatively mountable onto the driving assembly, the carrousel being made out of sectional segments, each sectional segment having a lower protruding vertical portion and a pair of flange portions each projecting from a corresponding side of the vertical portion, the sectional segments being interconnected to another so as to define the carrousel, the vertical portions of the sectional segments being positioned, shaped and sized so as to be disposed along the circular path of the base and for cooperating with the driving assembly in order to enable the carrousel to be rotatably moveable with respect to the base.

According to another aspect of the present invention, there is also provided a rotary milking station provided with at least one assembly selected from the group consisting of wheel assembly, suspension assembly, preload assembly, height-adjustment assembly and/or motorized-wheel assembly, such as the ones exemplified herein and/or such as any mechanical equivalents thereof.

According to another aspect of the present invention, there is provided a milking plant provided with the above-mentioned milking station and/or components thereof.

According to another aspect of the present invention, there is provided a method of installing (i.e. assembling) the above-mentioned milking station, milking plant and/or components thereof.

For example, and according to a preferred aspect of the present invention, there is provided a method for assembling a rotary milking station, the method comprising the steps of:

a) providing a base having a circular path disposed about a given center; and b) mounting a carrousel in a rotatable manner with respect to said base, the carrousel being made out of sectional segments, each sectional segment having a lower protruding vertical portion and a pair of flange portions each projecting from a corresponding side of the vertical portion, the sectional segments being interconnected to another so as to define the carrousel, the vertical portions of the sectional segments being disposed along the circular path of the base.

Preferably, step a) comprises the step of assembling a base template to be securely mounted onto a fixed structure of the base for defining the circular path and for defining the positioning of components of the driving assembly about said circular path, the base template being made of sectional pieces configured to be assembled to one another so as to form the base template.

According to another preferred aspect of the present invention, there is provided a method for assembling a rotary milking station using a base template, such as the one exemplified herein and/or such as any mechanical equivalents thereof.

According to another aspect of the present invention, there is provided a method of operating the above-mentioned milking station, milking plant and/or components thereof.

According to another aspect of the present invention, there is provided a kit with corresponding components for assembling the above-mentioned milking station, milking plant and/or components thereof.

According to yet another aspect of the present invention, there is also provided a method of assembling components of the above-mentioned kit.

According to yet another aspect of the present invention, there is also provided a method of doing business with the above-mentioned kit, milking station, milking plant and/or components thereof.

According to yet another aspect of the present invention, there is also provided a milk having been obtained with the above-mentioned kit, milking station and/or milking plant.

The objects, advantages and other features of the present invention will become more apparent upon reading of the following non-restrictive description of preferred embodiments thereof, given for the purpose of exemplification only, with reference to the accompanying drawings.

BRIEF DESCRIPTION OF THE DRAWINGS

FIGS. 11-60 are different views of various aspects, components and features of possible milking stations and/or different configurations thereof according to preferred embodiments of the present invention.

DETAILED DESCRIPTION OF PREFERRED EMBODIMENTS OF THE INVENTION

Figure 1:
FIGS. 1-10 are different views of milking stations and components thereof according to the prior art.

In the following description, the same numerical references refer to similar elements. The embodiments, geometrical configurations, materials mentioned and/or dimensions shown in the figures or described in the present description are preferred embodiments only, given for exemplification purposes only.

Moreover, although the present invention was primarily designed for milking cows along a preferred rotary milking station, it may be used with other types of stations and objects, and in other fields, as apparent to a person skilled in the art. For this reason, expressions such as "milk", "cow", "rotary", etc., used herein should not be taken as to limit the scope of the present invention and includes all other kinds of objects or fields with which the present invention could be used and may be useful.

Moreover, in the context of the present invention, the expressions "station", "kit", "plant", "device", "assembly", "system" and "unit", as well as any other equivalent expressions and/or compounds word thereof known in the art will be used interchangeably, as apparent to a person skilled in the art. This applies also for any other mutually equivalent expressions, such as, for example: a) "milk", "draw", "extract", "pump", "process", etc.; b) ""milk", "liquid", "fluid", etc.; c) "station", "parlor", "carousel" etc.; d) "rotating", "driving", "displacing", "moving", "supporting", "gliding", "conveying" etc.; e) "base", "template", "structure", etc.; f) "enable", "allow", etc.; g) "fastening", "securing", "attaching", "anchoring", "adjusting", "positioning", etc.; h) "hole", "bore", "slot", "slit", "cavity", etc.; i) "rotating", "pivoting", "turning", "rolling", etc.; as well as for any other mutually equivalent expressions, pertaining to the aforementioned expressions and/or to any other structural and/or functional aspects of the present invention, as also apparent to a person skilled in the art.

Furthermore, in the context of the present description, it will be considered that expressions such as "connected" and "connectable", or "mounted" and "mountable", may be interchangeable, in that the present invention also relates to a kit with corresponding components for assembling a resulting fully assembled rotary milking station.

In addition, although the preferred embodiment of the present invention as illustrated in the accompanying drawings may comprise various components, and although the preferred embodiment of the milking station as shown consists of certain geometrical configurations as explained and illustrated herein, not all of these components and geometries are essential to the invention and thus should not be taken in their restrictive sense, i.e. should not be taken as to limit the scope of the present invention. It is to be understood, as also apparent to a person skilled in the art, that other suitable components and cooperation thereinbetween, as well as other suitable geometrical configurations may be used for the milking station and corresponding components according to the present invention, as will be briefly explained hereinafter and as can be easily inferred herefrom by a person skilled in the art, without departing from the scope of the invention.

Broadly described, the present invention, as illustrated in the accompanying drawings, relates to a milking station to be used for milking cows and the like, as is well known in the art. The present milking station may be used for milking various other types of animals. The present milking station is preferably of simple design and inexpensive to manufacture. As will be shown hereinbelow, the present milking station possesses several advantages when compared to conventional milking stations known in the art.

Moreover, and as can be easily understood by a person skilled in the art, in view of the accompanying drawings, the milking station according to a preferred embodiment of the present invention is intended to be used as a working station for treating, or "milking" animals, typically milking cows, such as is known in the field of dairy farms and the like.

Broadly described, the present invention, as exemplified in the accompanying drawings, relates to a rotary milking station (1) comprising a base (3), a driving assembly (9) and a carrousel (11). The base (3) preferably has a circular path (5) disposed about a given center (7) (or "vertical axis" of rotation of the carrousel (11)). Preferably also, the driving assembly (9) is operatively mountable onto the base (3) so as to be disposed about the circular path (5) of the base (3). Moreover, the carrousel (11) is operatively mountable onto the driving assembly (9), and is made out of sectional segments (13), each sectional segment (13) having a lower protruding vertical portion (15) and a pair of flange portions (17a, 17b) each projecting from a corresponding side of the vertical portion (15), the sectional segments (13) being interconnected to another so as to define the carrousel (11), the vertical portions (15) of the sectional segments (13) being positioned, shaped and sized so as to be disposed along the circular path (5) of the base (3) and for cooperating with the driving assembly (9) in order to enable the carrousel (11) to be rotatably moveable with respect to the base (3), as can be easily understood when referring to FIGS. 11, 12, 18, 22 and 48-54, for example.

Preferably, the vertical portion (15) of each sectional segment (13) has a substantially trapezoidal shape, and is slightly tapered downwardly, as better shown in FIGS. 13-17.

As can be easily understood by a person skilled in the at when referring to FIGS. 11-24 for example, the vertical portion (15) of each sectional segment (13) is preferably designed so as to be the main load-bearing structural portion of the sectional segment (13). Indeed, contrary to the prior art wherein the main load-bearing structural portion (ex. I-beam) of a carrousel is "radially" disposed with respect to its center, the vertical portion (15) of each sectional segment (13) of the present rotary milking station (1) is "tangentially" or "arcuately" disposed with respect to its center (7), as schematically represented in FIG. 24.

According a preferred aspect of the present invention, and as also shown in these figures, each sectional segment (13) comprises a lower profiled plate (19) having a cavity (21) with a pair of opposite rims (23a,23b), said lower profiled plate (19) defining a bottom contour (25) of the vertical portion (15) and of the flange portions (17a, 17b) of the sectional segment (13), as better exemplified in FIG. 17.

As can be easily understood when referring to FIGS. 21-24, the cavity (21) of each lower profiled plate (19) of each sectional segment (13) is configured for receiving a corresponding filling construction material (27) therein, such as concrete for example, or any other suitable material, as apparent to a person skilled in the art, so that once said filling construction material (27) has hardened within the cavity (21), each sectional segment (13) comprises a substantially leveled upper surface (29). Such filling is done so that the upper surfaces (29) of the sectional segments (13) be substantially flush with one another so as to provide the carrousel (11) with a substantially leveled overall working surface (29).

According to a preferred embodiment of the present invention, each lower profiled plate (19) is a plate formed with high-precision laser cutting, and is preferably a unitary plate (19) having been bent along different segments (31a) so as to define the vertical portion (15) and the flange portions (17a, 17b) of each corresponding sectional segment (13), as can be easily understood when referring to FIGS. 11-17. Preferably also, each unitary plate (19) is also bent along other different segments (31b) so as to define the opposite rims (23a,23b) of the sectional segment (13), as better shown in FIG. 17.

Each sectional segment (13) is preferably constructed so as to comprise at least one reinforcement component (33) disposed within the cavity (21) of the lower profiled plate (19) so as to provide a corresponding reinforcement to the sectional segment (13), as exemplified in FIGS. 11, 13, 14, 18, 19 and 21. As also shown, each sectional segment (13) may comprise at least one pair of reinforcement components (33).

Figure 13:
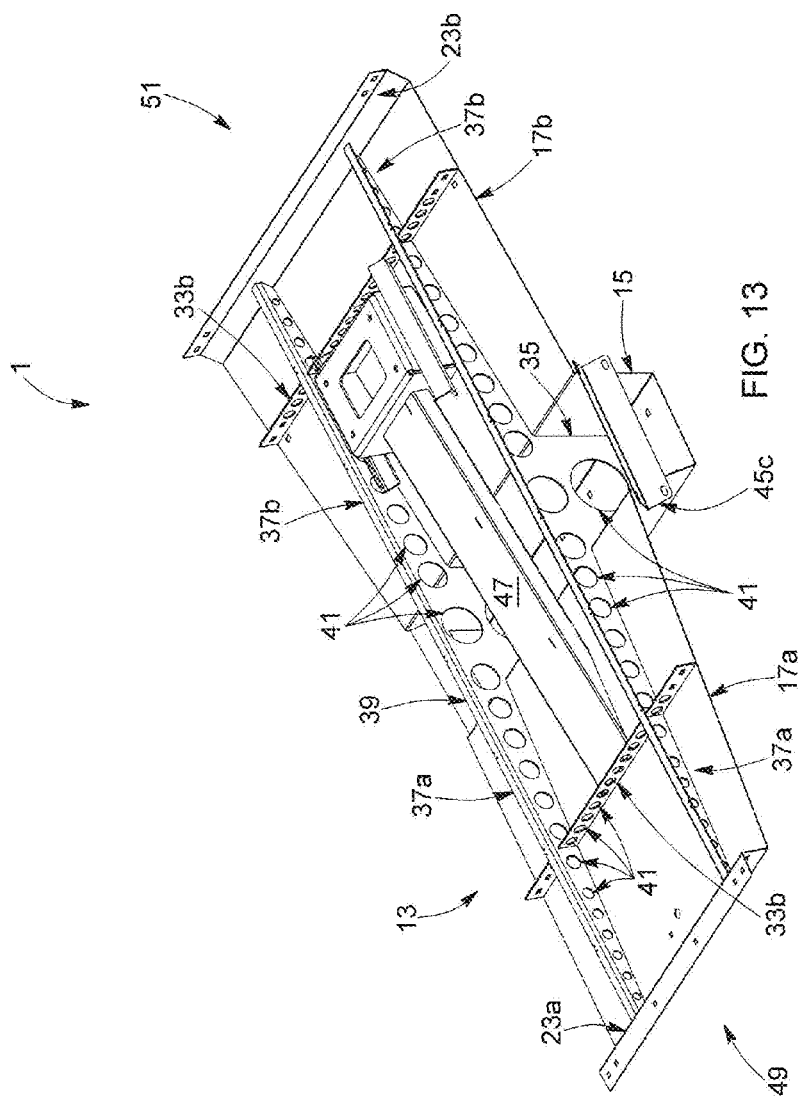
Figure 14:
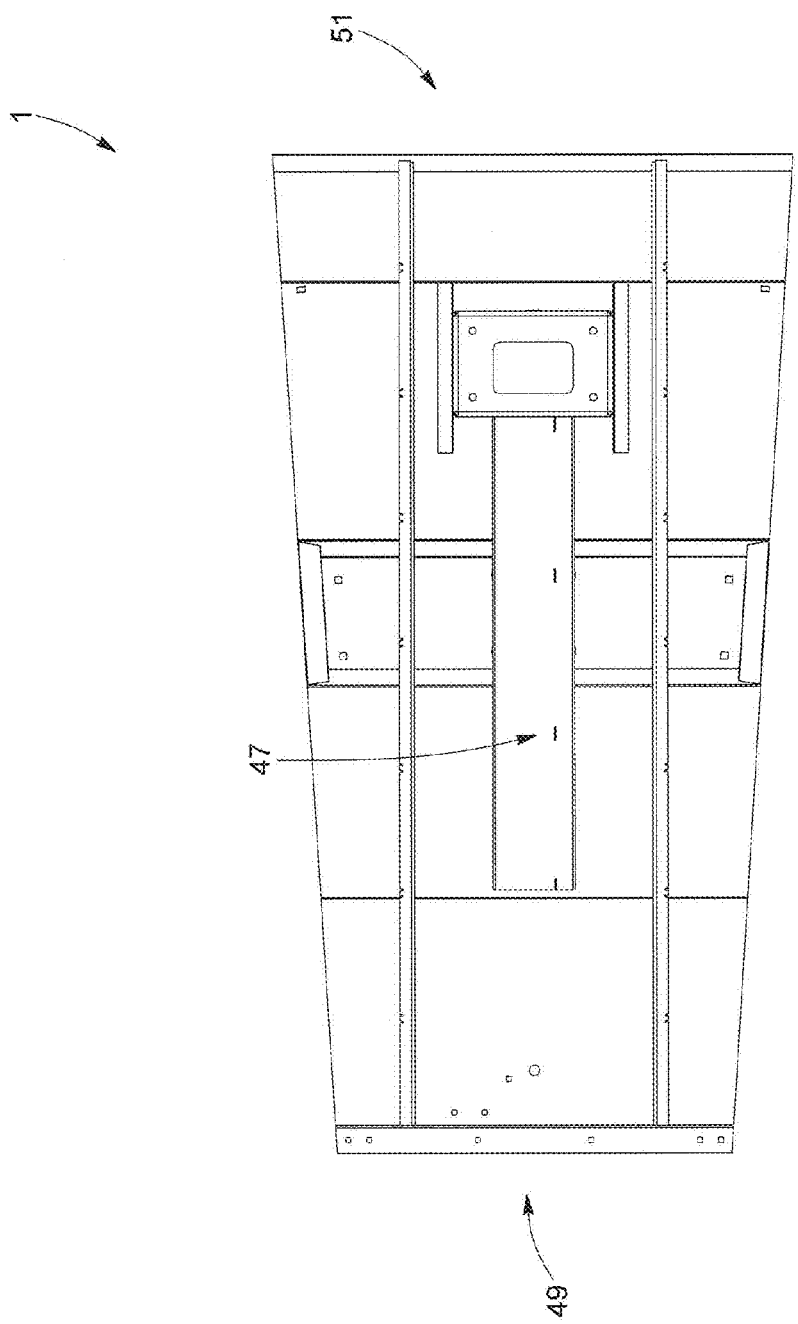

According to one alternative, each reinforcement component (33a) spans across both corresponding flange portions (17a, 17b) of a given sectional segment (13), and preferably, each reinforcement component (33b) spans between opposite rims (23a, 23b) of a corresponding lower profiled plate (19) of a given sectional segment (13), as better shown in FIG. 13, for example.

Preferably, each such reinforcement component (33a) is complementary in shape to that of a given sectional segment (13), and comprises a lower protruding vertical component (35) and a pair of flange components (37a, 37b), each flange component (37) projecting from a corresponding side of the vertical component (35). Preferably also, the vertical component (35) of each reinforcement component (33a) is nested within the vertical portion (15) of the given sectional segment (13), so that a cross-sectional section of the vertical component (35) and a cross-sectional section of the vertical portion (15) lie substantially aligned within a same plane.

According to another alternative, each reinforcement component (33b) may be substantially parallel to the vertical portion (15) of a given sectional segment (13), and preferably spans between lateral sides of each flange portion (17) of a given sectional segment (13), as also better shown in FIG. 13.

Preferably, each reinforcement component (33), whether a "radial" reinforcement component (33a) or a "tangential" (or "cross-wise") reinforcement component (33b), is a reinforcement truss (39) provided with a plurality of orifices (41) being positioned, shaped and sized so as to reduce an overall weight of the reinforcement truss (39) while maintaining the structural integrity thereof.

Preferably, each cavity (21) of each sectional segment (13) may further comprise reinforcement meshing (43) (ex. meshing of reinforcement bars, etc.) disposed therein so as to further reinforce each sectional segment (13).

According to a preferred embodiment of the present invention, each reinforcement component (33) of a given sectional segment (13) of the carrousel (11) is connected to another reinforcement component (33) of a neighboring sectional segment (13) of the carrousel (11) by means of at least one interconnecting component (45a), as better shown in FIGS. 19 and 20, for example.

Similarly, each rim (23) of a given sectional segment (13) of the carrousel (11) is preferably connected to another rim (23) of a neighboring sectional segment (13) of the carrousel (11) by means of at least one other interconnecting component (45b).

Preferably also, each vertical portion (15) of a given sectional segment (13) of the carrousel (11) is connected to another vertical portion (15) of a neighboring sectional segment (13) of the carrousel (11) by means of at least one other interconnecting component (45c).

In order to allow passage of corresponding conduits, cables and other components that are typically employed in a rotary milking station, at least one given portion of each sectional segment (13) of the present rotary milking station (1) comprises a through-channel (47) extending from a first side (49) (ex. an "inner" side, that is, one inside the carrousel (11)) of the sectional segment (13) to a second side (51) thereof (ex. an "outer" side, that is, one outside the carrousel (11)). Moreover, and according to another alternative, the through-channel (47) may extending from a bottom side (49) of the sectional segment (13) to a top side (51) thereof, whether within a same flange portion (17a, 17b), or from one to the other, as can be easily understood by a person skilled in the art.

According to the present invention, the driving assembly (9) of the rotary milking station (1) preferably comprises at least one assembly selected from the group consisting of wheel assembly (9a), suspension assembly (9b), preload assembly (9c), height-adjustment assembly (9d), height-displacement assembly (9e) and motorized-wheel assembly (9f), each providing a corresponding advantage to the present rotary milking station (1) as will be explained in greater detail hereinbelow.

According to a preferred embodiment of the present invention, and as exemplified in the accompanying figures, the rotary milking station (1) comprises a plurality of wheel assemblies (9a) disposed about the circular path (5) of the base (3), each wheel assembly (9a) comprising at least one rotable wheel (53) for operatively supporting thereon a portion of the carrousel (11), the wheel assemblies (9a) being configured for allowing the carrousel (11) to rotate with respect to the circular path (5) over said wheels (53).

Figure 33:
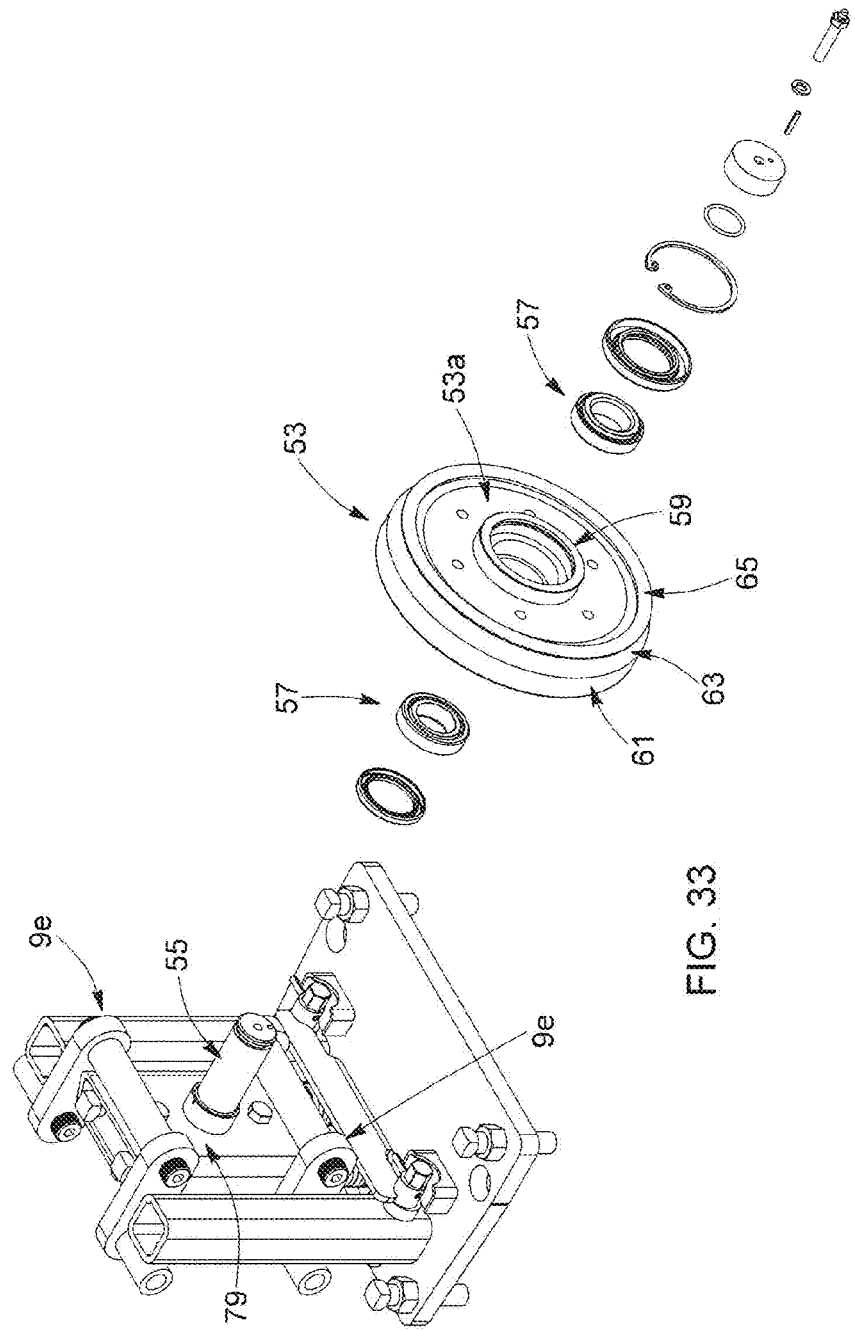

As can be easily understood when referring to FIGS. 25-43, each wheel (53) is preferably mountable onto a corresponding axle (55) by means of at least one ball-bearing (57) disposed about the hub (59) of the wheel (53), as better shown in FIG. 33. Preferably, each ball-bearing (57) is a tapered conical ball-bearing (57), but is worth mentioning that other suitable ball-bearings (57) and/or other suitable components may be used for appropriately mounting the wheel (53) onto its axle (55), depending on the particular applications for which the present rotary milking station (1) is intended for, and the desired end results, as apparent to a person skilled in the art.

As better shown in FIGS. 25-34, each wheel (53) preferably comprises an outer peripheral rim (61) having a slanted portion (63), as well as a frontal bumper portion (65). The frontal bumper portion (65) is intended to cooperate with an abutment flange (115) of the carrousel (11), as will be explained in greater detail hereinbelow when referring to FIGS. 48-54.

Figure 34:
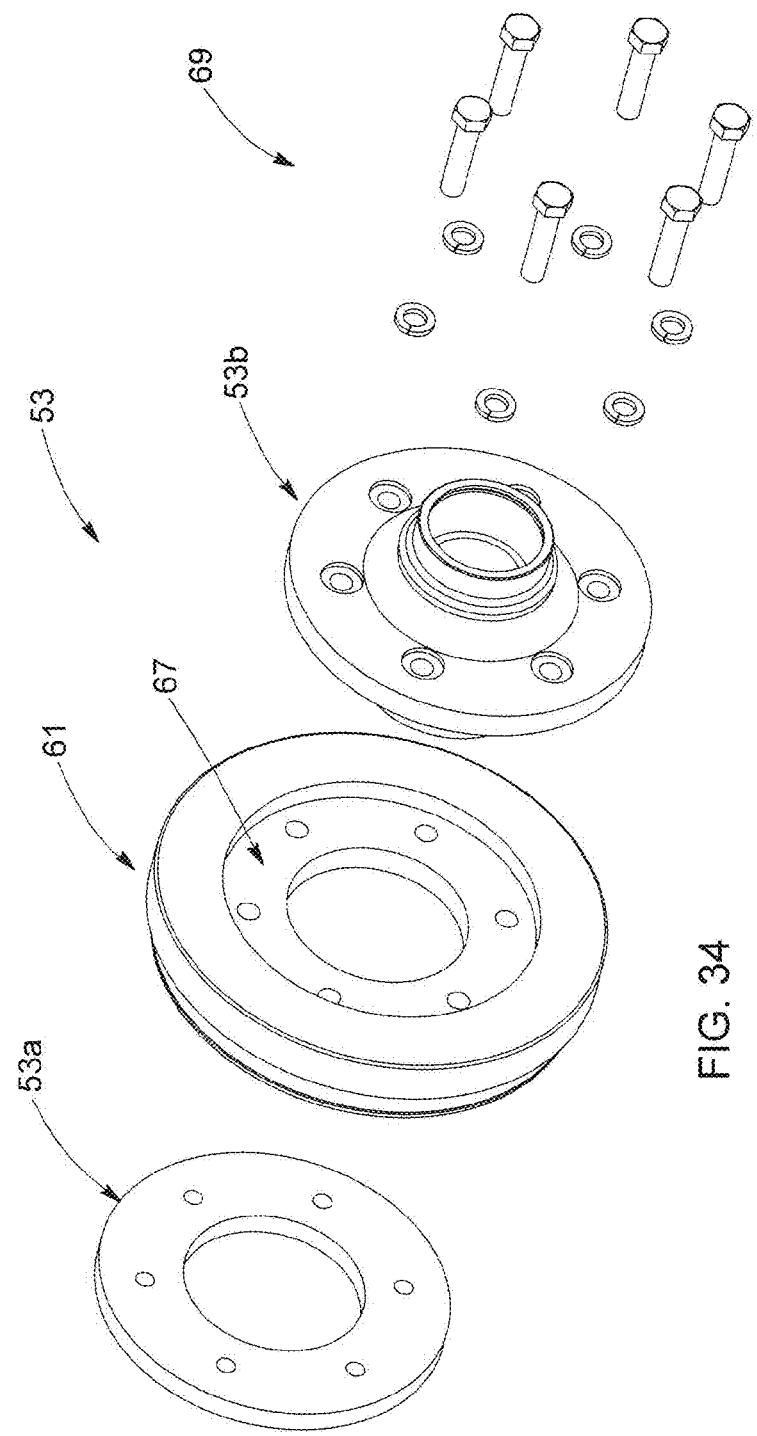

Preferably also, and as better exemplified in FIGS. 31-34, each wheel (53) comprises a replaceable outer peripheral rim (61), and according to a preferred embodiment of the present invention, each wheel (53) comprises an outer peripheral rim (61) and an inner anchoring portion (67), the inner anchoring portion (67) being removably mountable between a pair of complementary components (53a, 53b) of the wheel (53) by means of corresponding fasteners (69), and wherein the outer peripheral rim (61) is disposed circumferentially about the complementary components (53a, 53b) when securely mounted onto one another, as can be easily understood when contrasting FIGS. 33 and 34.

According to a preferred embodiment of the present invention, and as better shown in FIGS. 25-43, each wheel assembly (9a) comprises a base (71), at least one supporting post (73), and a wheel (53) operatively mounted onto said at least one supporting post (73), and being vertically moveable with respect to the base via a displacement assembly (9e), that is, a "height-displacement" assembly (9e) for enabling a vertical movement of each wheel (53).

According to one preferred alternative, the displacement assembly (9e) comprises at least one lower supporting arm (75) (or first "supporting component"), at least one upper supporting arm (77) (or second "supporting component") and a mounting assembly (79). Each lower supporting arm (75) preferably has a first end (75a) hingedly connected to a corresponding supporting post (73) and a second end (75b) rotatably moveable with respect to its first end (75a). Similarly, each upper supporting arm (77) preferably has a first end (77a) hingedly connected to a corresponding supporting post (73) and a second end (77b) rotatably moveable with respect to its first end (77a). Preferably also, the mounting assembly (79) is securely connectable onto the second ends (75b, 77b)

of each upper and lower supporting arms (75,77) so as to be vertically moveable with said arms (75,77), each wheel (53) being mountable onto the mounting assembly (79) so as to be vertically moveable with respect to the base (71) in accordance with a movement of the supporting arms (75,77).

According to a preferred embodiment of the present invention, and as exemplified in the accompanying drawings, each wheel assembly (9a) of the present rotary milking station (1) comprises a pair of supporting posts (73), a pair of lower supporting arms (75), and a pair of upper supporting arms (77).

The mounting assembly (79) may comprise a housing (81) provided with lower and upper cylinders (83,85), the lower cylinder (83) having an extremity pivotably mounted onto a corresponding second end (75b) of a lower supporting arm (75) and the upper cylinder (85) having an extremity pivotably mounted onto a corresponding second end (77b) of an upper supporting arm (77).

Figure 35:
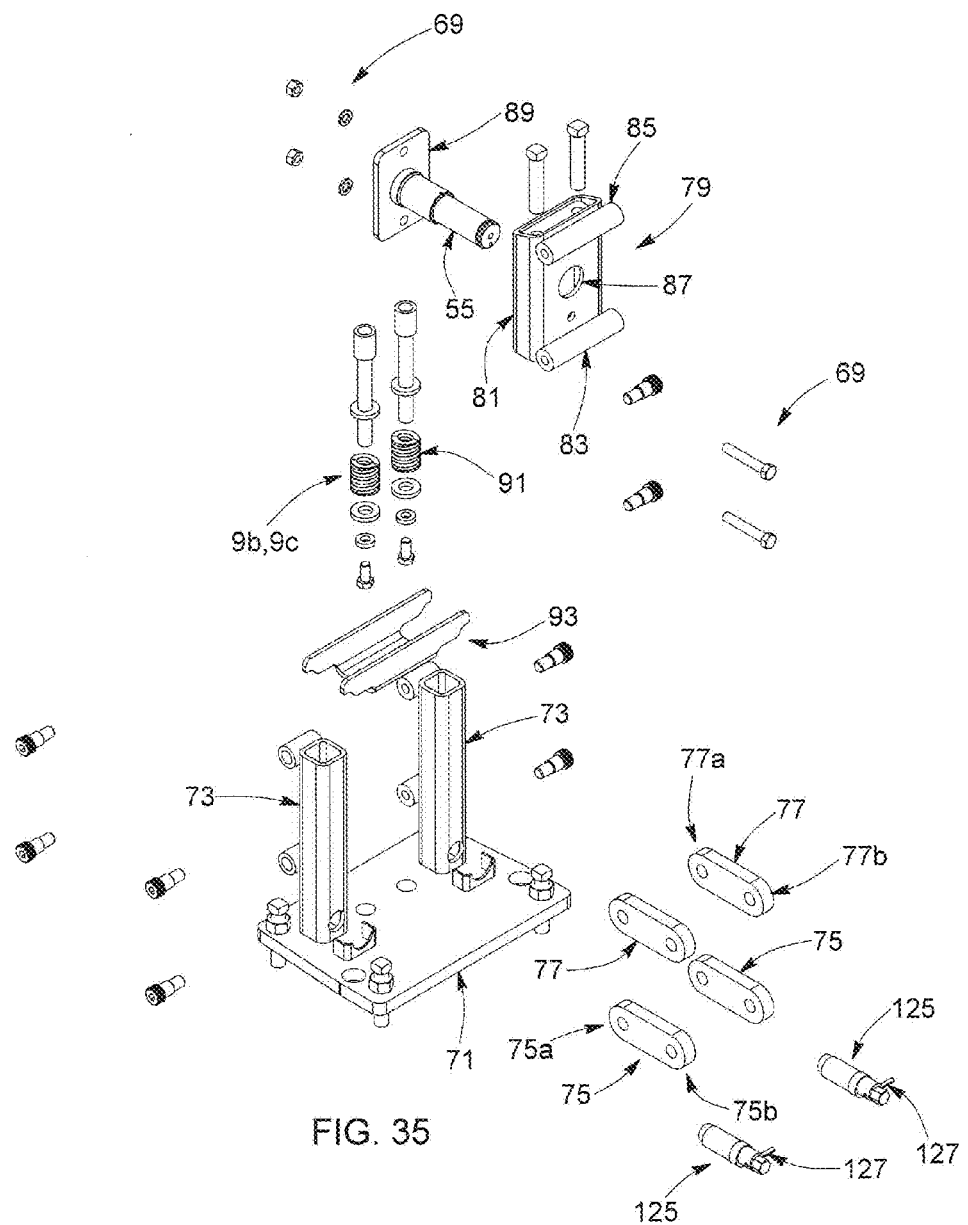
Figure 36:
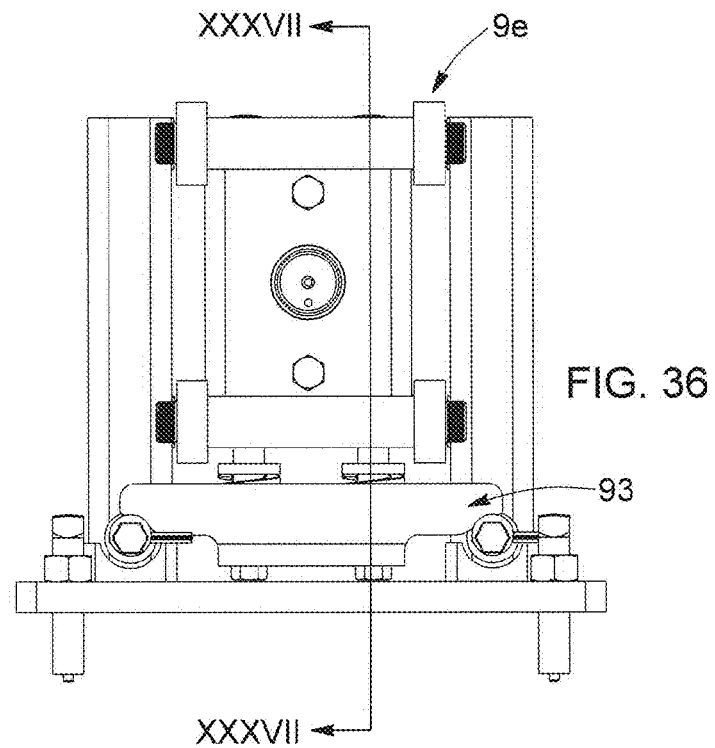
Figure 37:
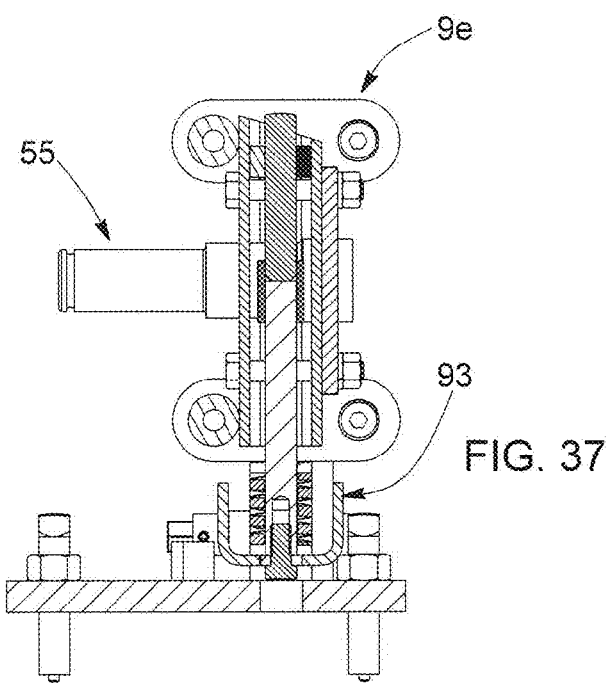

As better shown in FIG. 35, the housing (81) may also comprises a bore (87) for receiving a corresponding axle (55) of the wheel (53), the axle (55) being preferably provided with a base bracket (89) removably connectable onto a back portion of the housing (81) via corresponding fasteners (69).

According to another preferred aspect of the present invention, each wheel assembly (9a) is provided with a corresponding suspension assembly (9b). As shown in the accompanying drawings, each suspension assembly (9b) comprises at least one spring (91) operatively disposed between the base (71) of the wheel assembly (9a) and a bottom mounting component of the wheel (53). Similarly, and according to another preferred embodiment of the present invention, each wheel assembly (9a) is provided with a corresponding preload assembly (9c). Preferably, and as can be easily understood by a person skilled in the art when referring to the accompanying drawings, each preload assembly (9c) comprises at least one spring (91) operatively disposed between the base (71) of the wheel assembly (9a) and a bottom mounting component of the wheel (53), each spring (91) having a given preload selected in accordance with a corresponding weight to be put on each sectional segment (13) of the rotary milking station (1), such as, for example, the weight of the cows to be placed onto each sectional segment (13) and the associated equipment of the rotary milking station (1) on each sectional segment (13).

According to the preferred embodiments of the present invention illustrated in the accompanying drawings, each sectional segment (13) is supported by two wheel assemblies (9a), each wheel assembly (9a) comprises two suspension springs (91), and each spring (91) also acts as a preload spring (91).

According to another preferred aspect of the present invention, the rotary milking station (1) comprises a disengagement assembly (9g) operatively connected to each wheel assembly (9a), each disengagement assembly (9g) including a spring support (93) abutting against a corresponding spring (91), the spring support (93) being operable between a first configuration where the corresponding spring (91) is allowed to be operated along its effective length, and a second configuration where the spring support (93) is biased against the spring (91) for shortening its effective length, so as to allow a wheel (53) of the wheel assembly (9a) to be disengaged from the carrousel (11), as can be easily understood by a person skilled in the art when referring to FIGS. 25-43.

Preferably, and as better shown in FIGS. 38-43, the spring support (93) is operable between the first and second configurations via at least one cam assembly (123), each cam assembly (23) having an eccentrically mounted rotatable component (125) being cooperable with the spring support (93) so as to raise and lower said spring support (93) via a corresponding rotation, each cam assembly (123) being provided with a corresponding lever (127).

According to another preferred aspect of the present invention, each wheel assembly (9a) is provided with a corresponding height-adjustment assembly (9d) for adjusting a height of the base (71) of the wheel assembly (9a) with respect to the base (3) of the rotary milking station (1).

Preferably, and as be easily understood when referring to FIGS. 45-52, each height-adjustment assembly (9d) comprising at least one height-adjustment hole (95) provided on the base (71) of the wheel assembly (9a), each height-adjustment hole (95) being provided with inner threading, and at least one height-adjustment fastener (97) threadedly engaged with a corresponding height-adjustment hole (95) via a complementary outer threading, each height-adjustment fastener (97) having a distal pin (99) pivotably insertable into a corresponding hole (101) of the base (3) of the rotary milking station (1) and being rotatable with respect to the corresponding height-adjustment hole (95) so that the base (71) of the wheel assembly (9a) may be displaceable in height with respect to the base (3) of the rotary milking station (1) via a corresponding rotation of the height-adjustment fastener (97).

Figure 45:
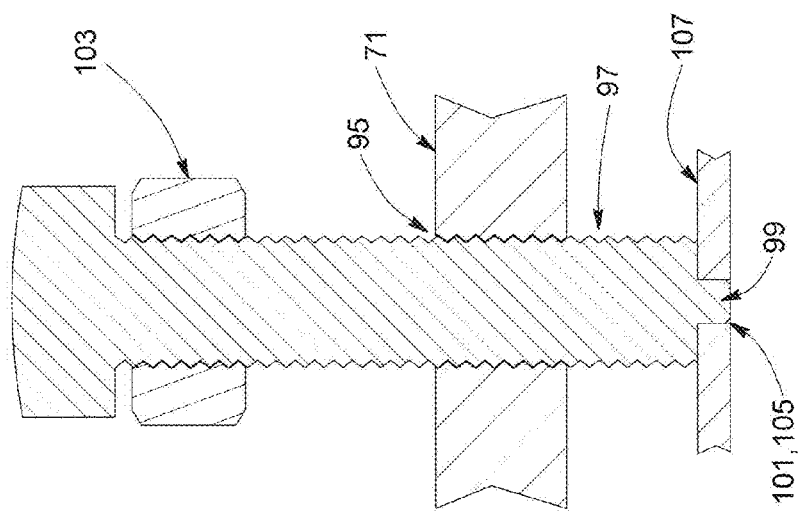
Figure 46:
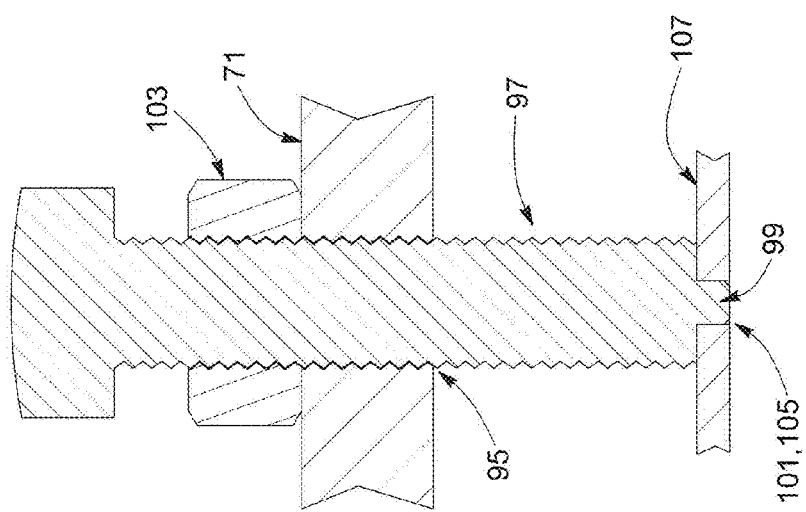
Figure 47:
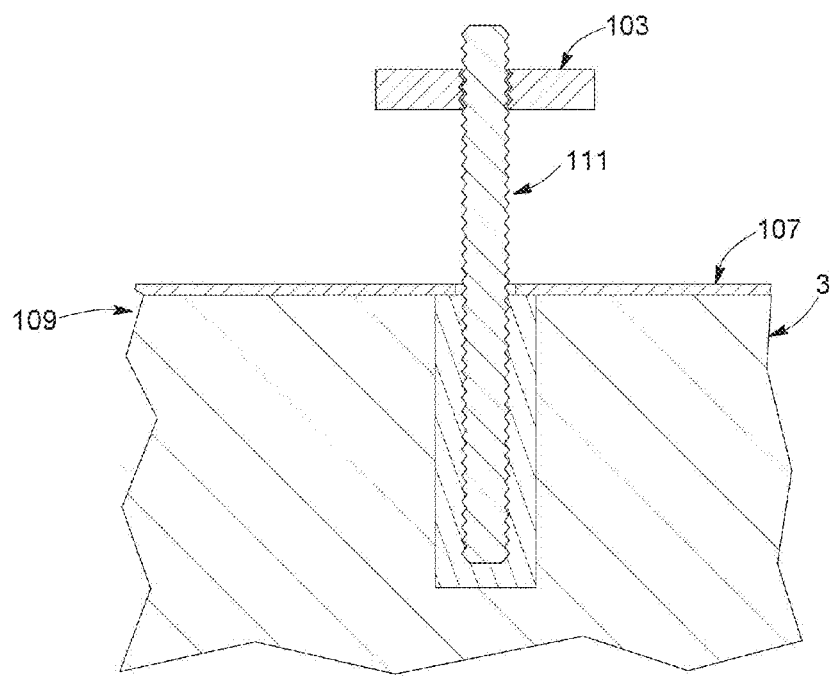
Figure 48:
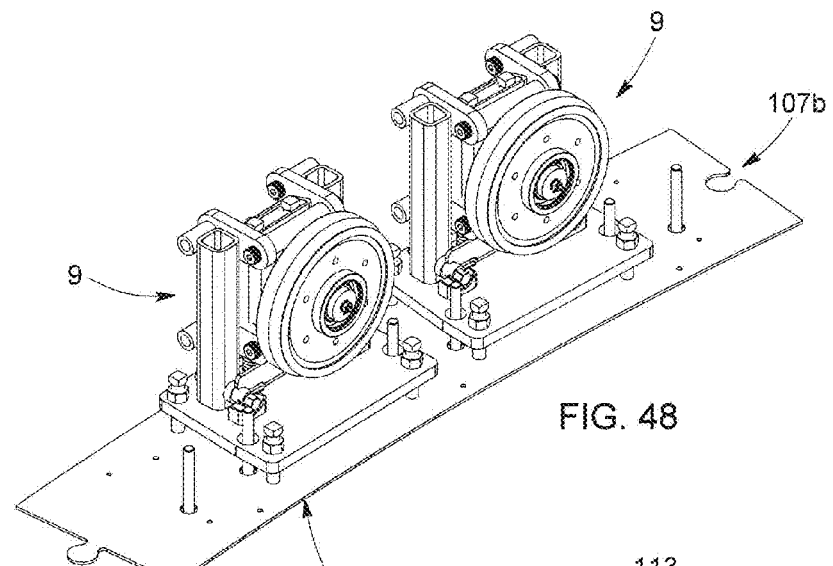

As also shown, each height-adjustment fastener (97) is preferably provided with a corresponding nut (103) displaceable along said height-adjustment fastener (97) and removably securable against the base (71) of the wheel assembly (9a) for selectively locking the wheel assembly (9a) in place at a fixed height with respect to the base (3) of the rotary milking station (1), as can be easily understood by a person skilled in the art when referring to FIGS. 45 and 46, for example According to the preferred embodiment of the present invention, as exemplified in the accompanying drawings, each wheel assembly (9a) is provided with four height-adjustment holes (95) and four corresponding height-adjustment fasteners (97). It is worth mentioning also that each height-adjustment hole (95) may also serve as a positioning hole (95) for ensuring a proper positioning of each wheel assembly (9a) onto corresponding holes (105) of the base (3) of the rotary milking station (1), as will be explained in greater detail hereinbelow when referring to the base template (107) of the rotary milking station (1), and associated features.

Indeed, according to another preferred aspect of the present invention, the base (3) of the rotary milking station (1) is preferably defined using a base template (107) being securely mountable onto a fixed structure (109) (ex. an elevated concrete base (3), for example) for defining the circular patch (5) and for defining an accurate positioning of components of the driving assembly (9) about said circular path (5), the base template (107) being made of sectional pieces (107a) configured to be assembled to one another so as to form the base template (107).

Preferably, and as can be easily understood when referring to FIGS. 11, 18 and 44-49, each sectional piece (107a) of the base template (107) comprises interlocking components (107b) for allowing a given sectional piece (107a) to be interlocked with corresponding first and second neighboring sectional pieces (107a) so as to form the base template (107). Preferably, each sectional piece (107a) of the base template (107) is a piece formed with high-precision laser cutting.

Figure 44:
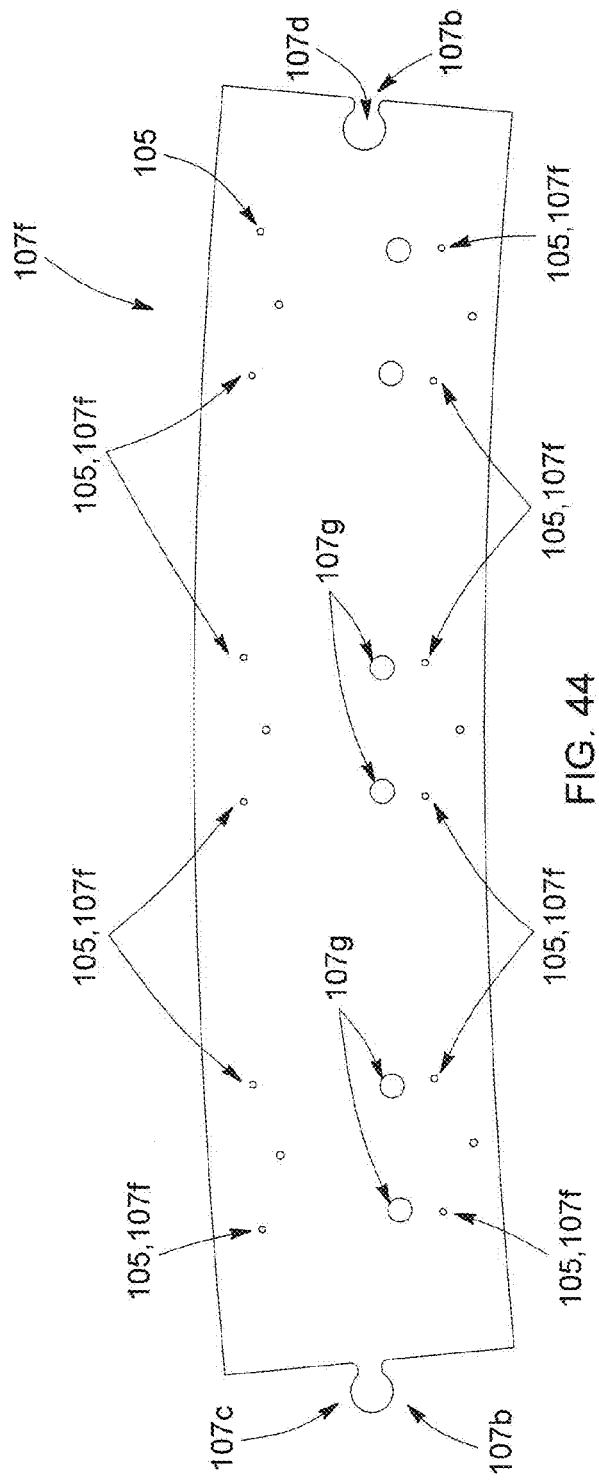

As better shown in FIG. 44, the interlocking components (107b) of each sectional piece (107a) of the base template (107) comprises at least one tenon component (107c) on a first lateral side of the sectional piece (107a) and at least one corresponding mortise component (107d) on a second lateral side of the sectional piece (107a).

Preferably, each sectional piece (107a) of the base template (107) comprises at one pre-established securing hole (107e) for receiving a corresponding securing component used to secure the base template (107) onto the base (3) of the rotary milking station (1). Each sectional piece (107a) of the base template (107) may also preferably comprise at one pre-established positioning hole (107f) for receiving a corresponding component of the driving assembly (9), for ensuring a specific positioning of the driving assembly (9) with respect to the base template (107). Preferably also, each sectional piece (107a) of the base template (107) may comprises at least one pre-established anchoring hole (107g) for receiving a corresponding anchoring component (111) used to cooperate with a corresponding wheel assembly (9a), as better shown in FIGS. 47-49 for example. It is worth mentioning that each anchoring component (111) is preferably a threaded component (111) intended to be anchored into a pre-drilled hole (129) of the base (3), filled with a corresponding suitable anchoring filling material (ex. epoxy, etc.), each anchoring component (111) being intended to receive a corresponding nut (131) cooperable with the base (71) of a corresponding wheel assembly (9a).

Figure 11:
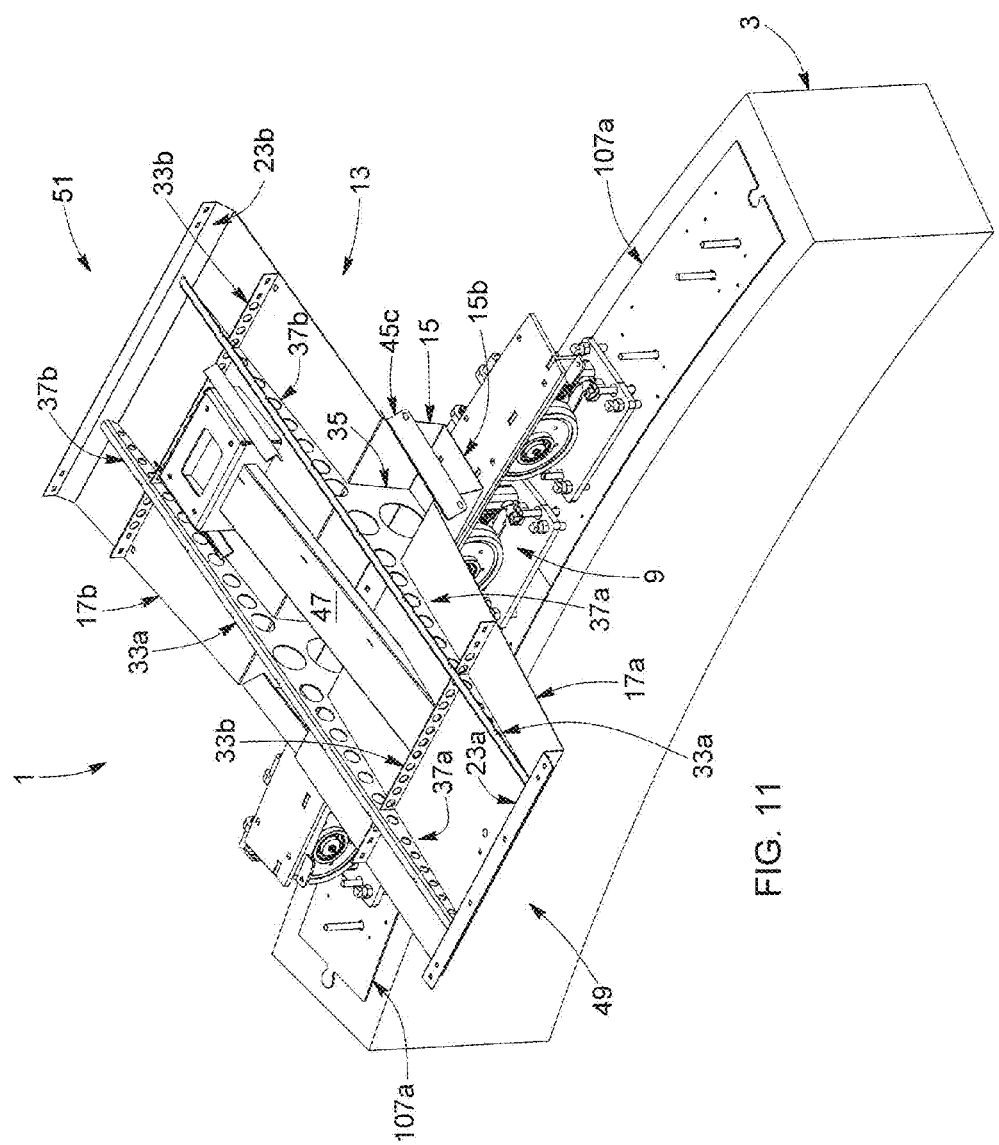
Figure 12:
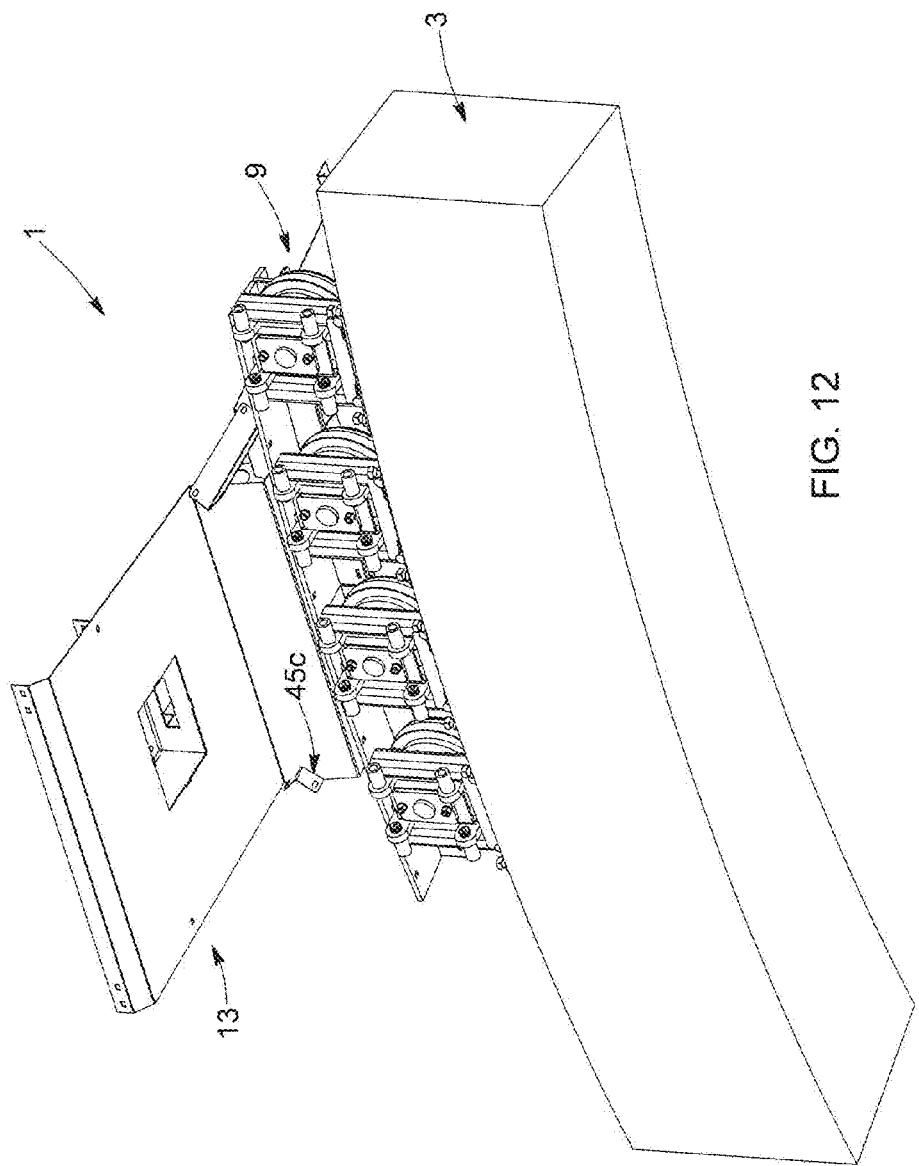
Figure 49:
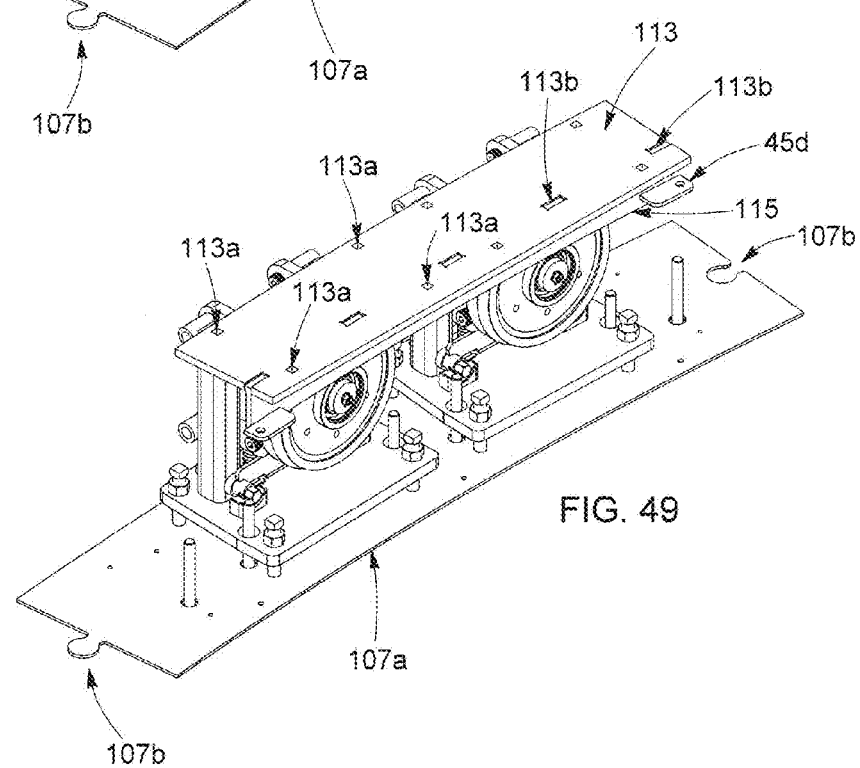
Figure 50:
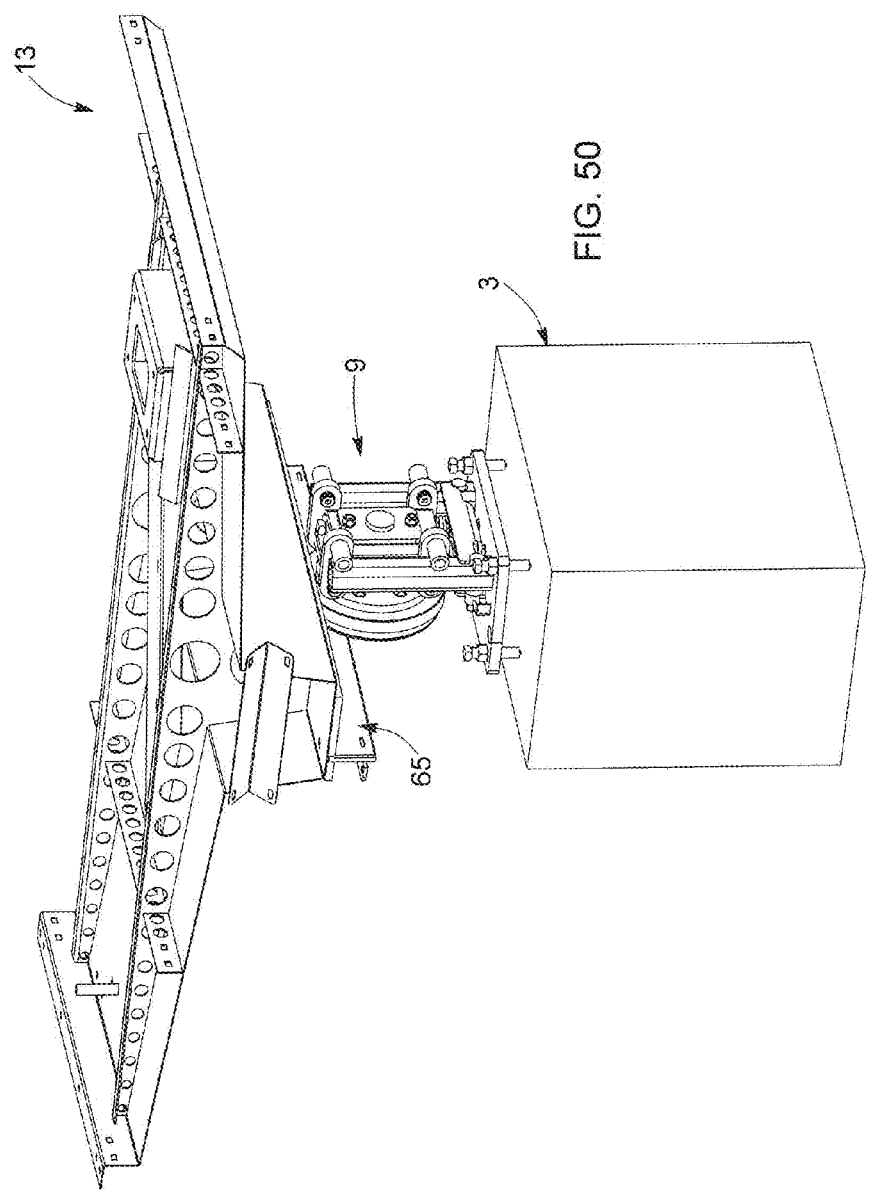
Figure 51:
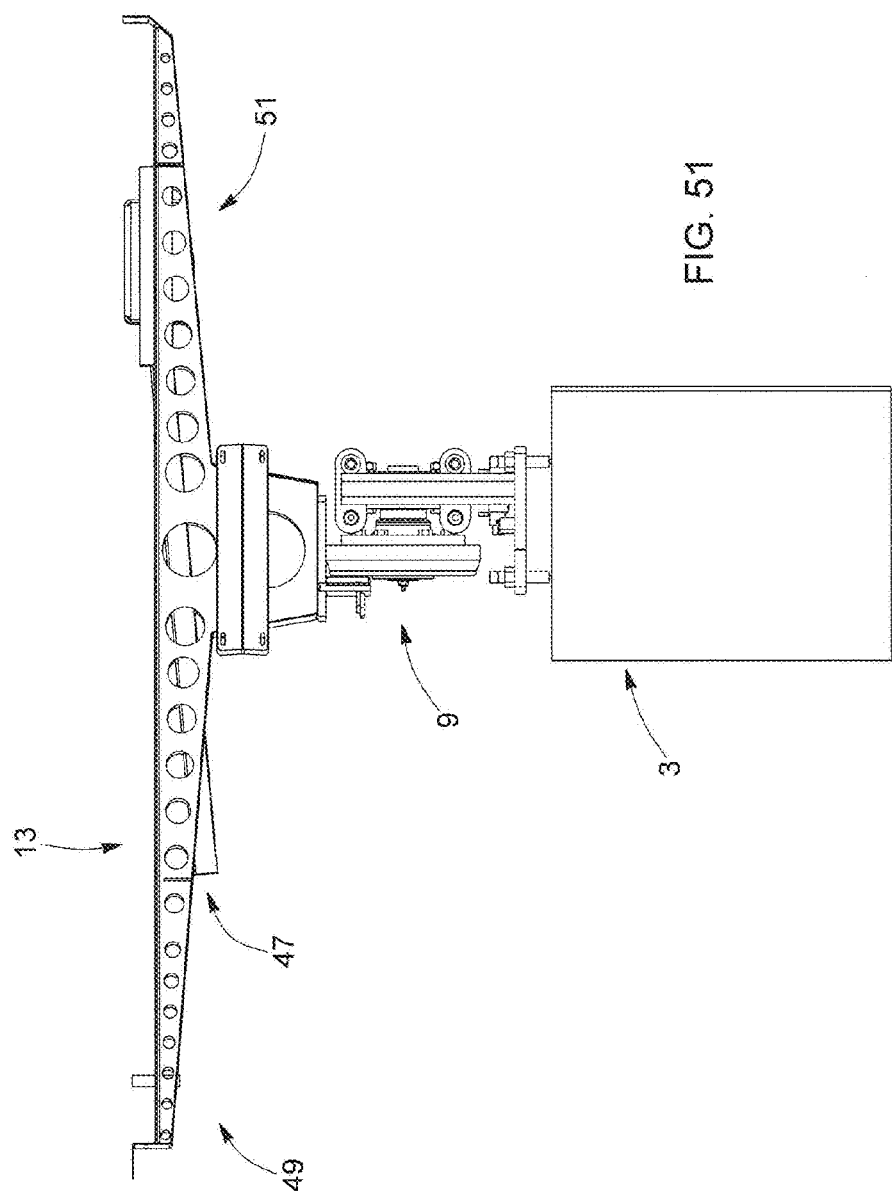
Figure 52:
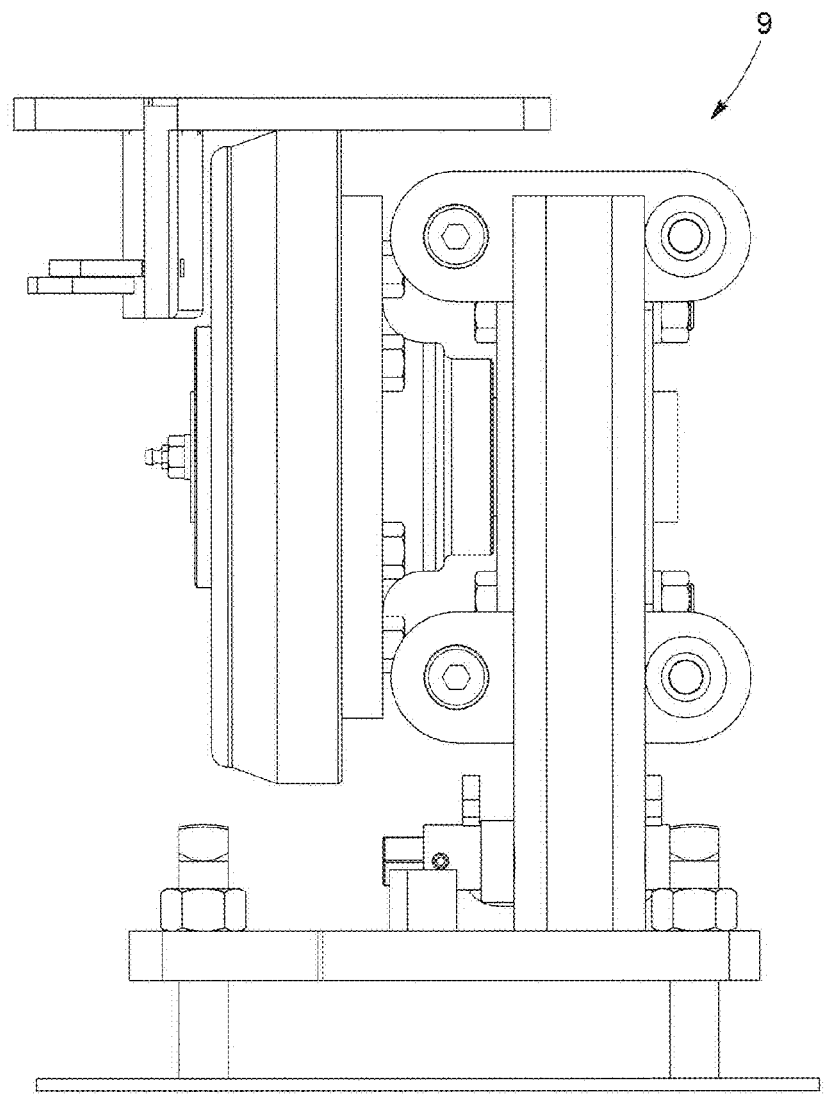
Figure 53:
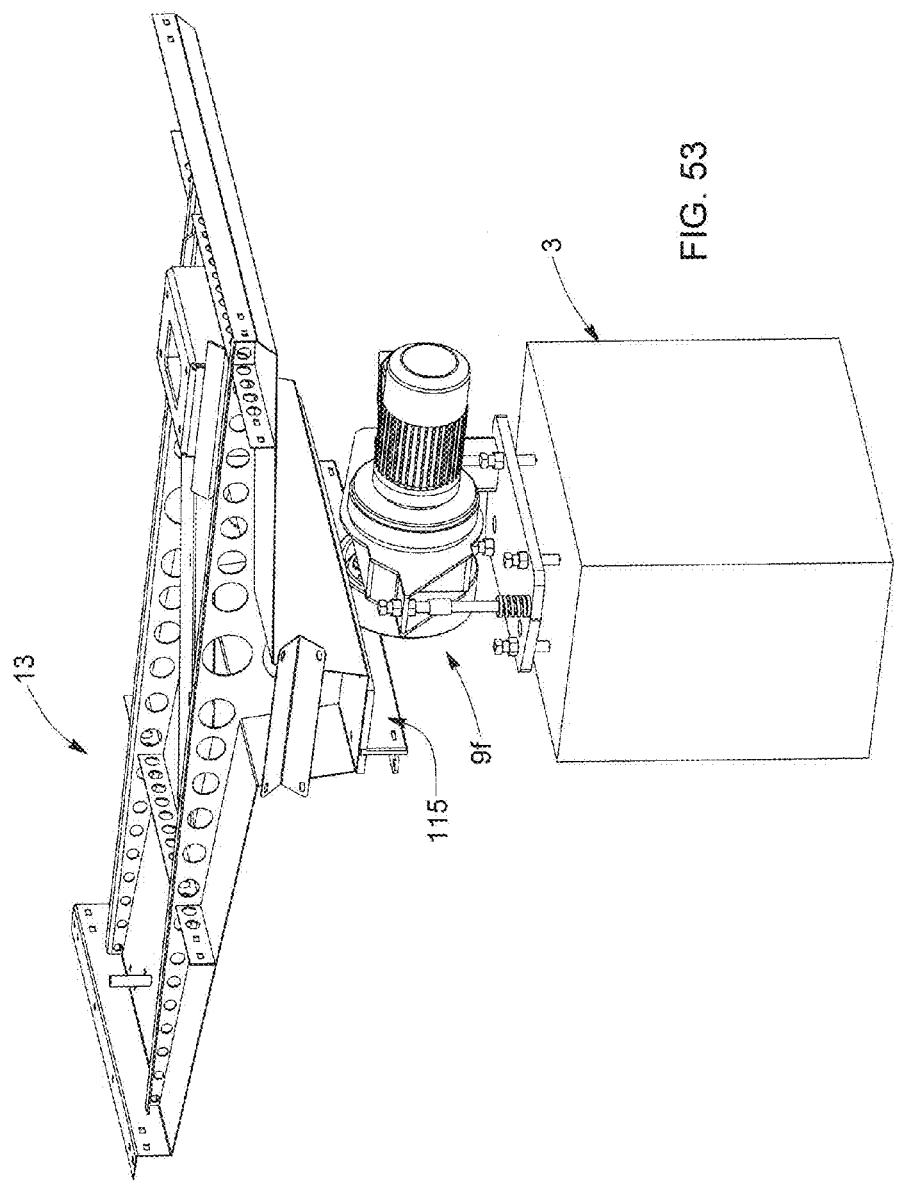
Figure 54:
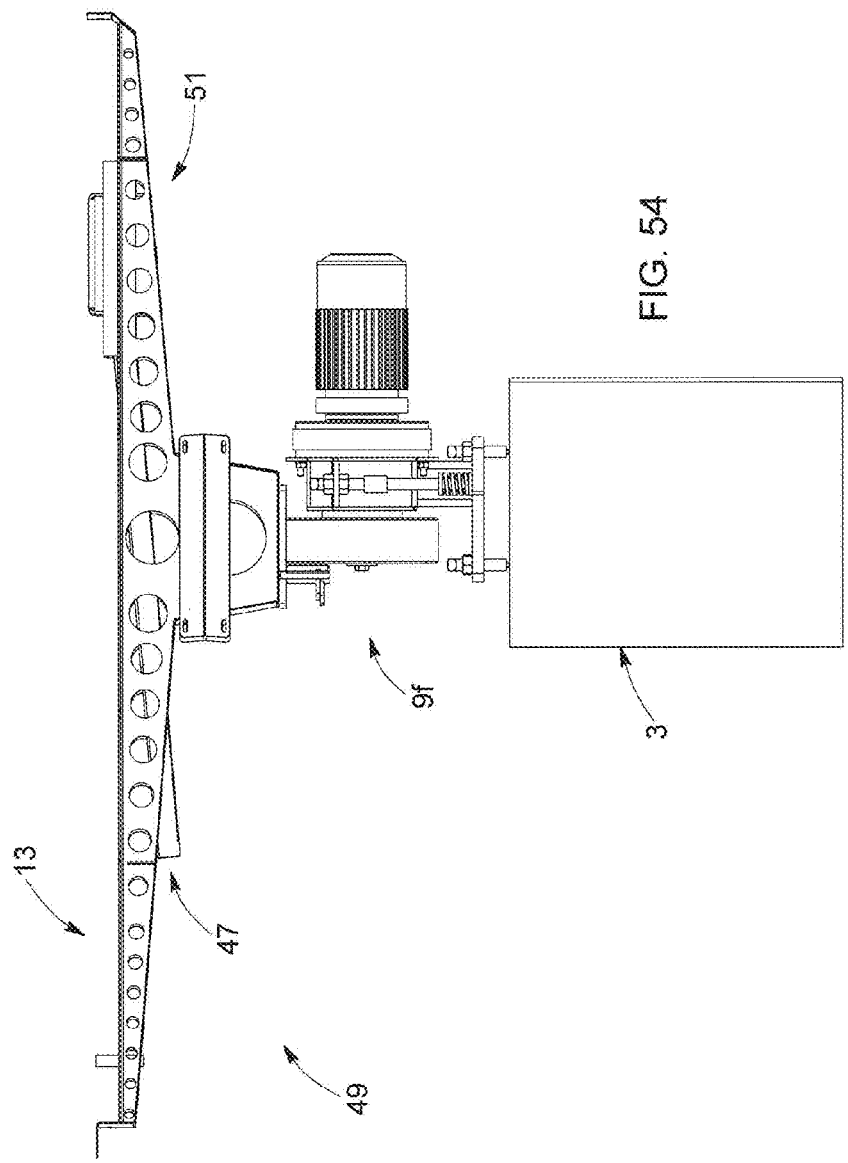
Figure 55:
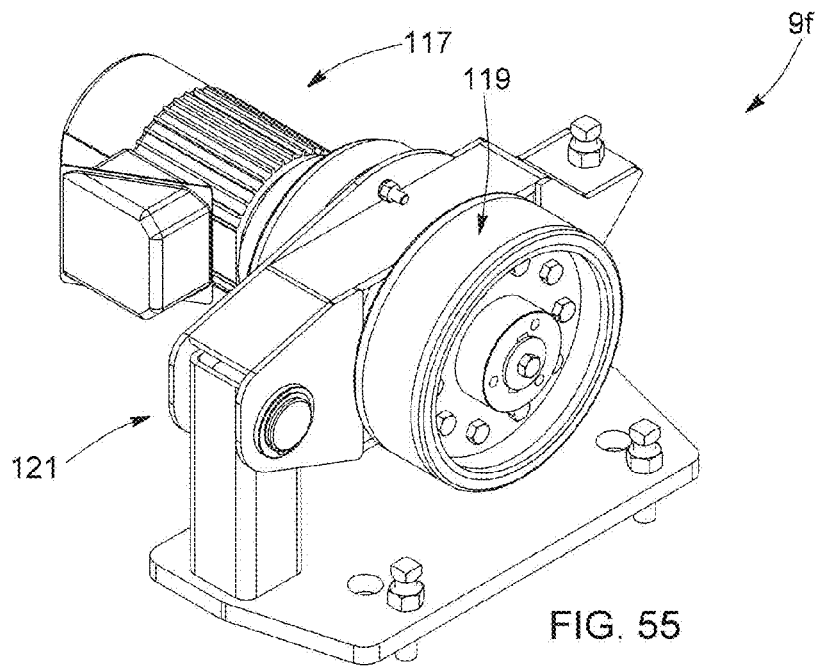
Figure 56:
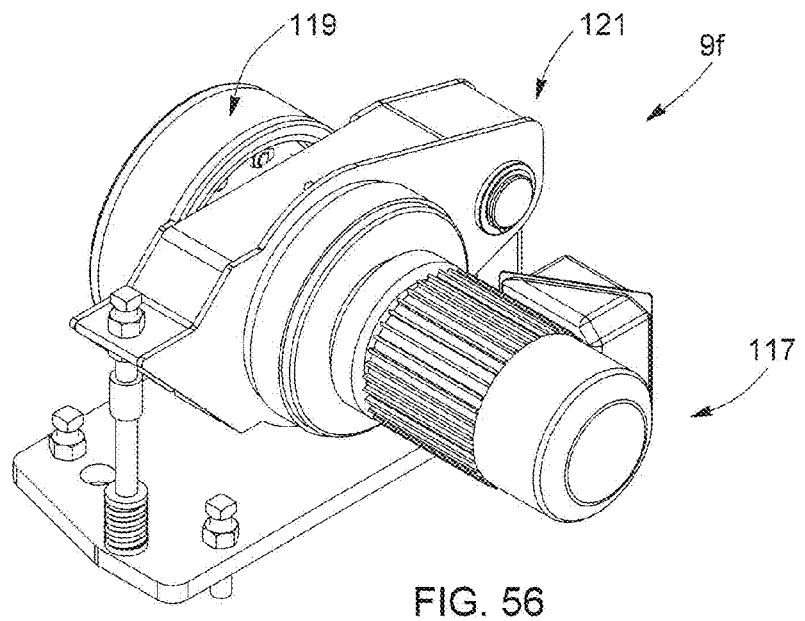
Figure 57:
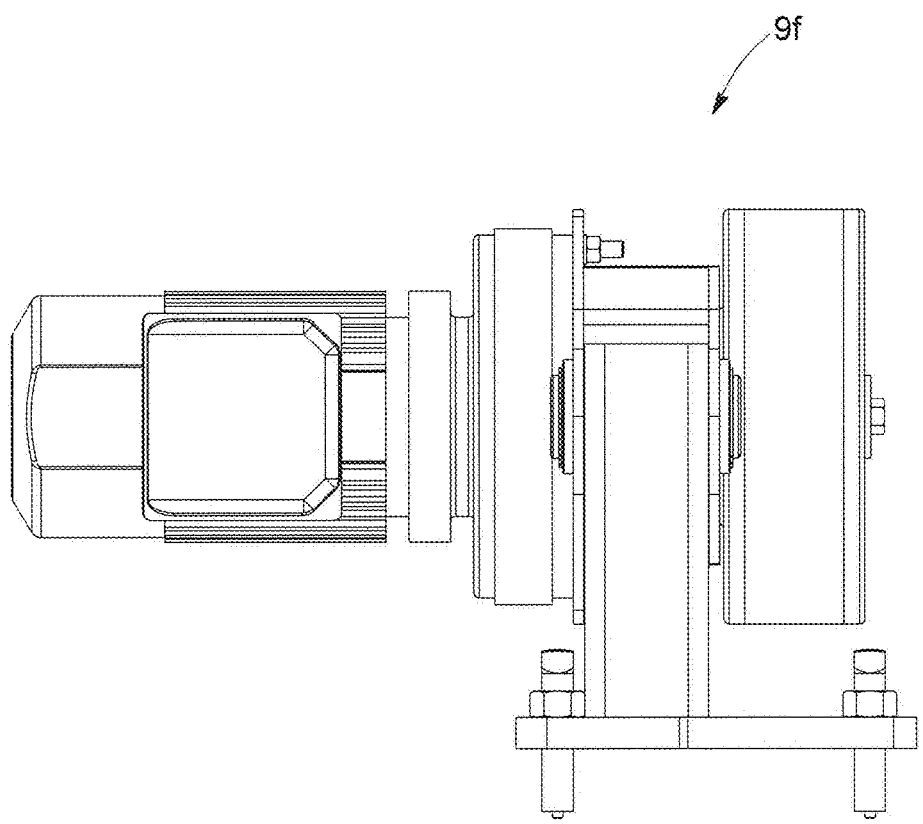
Figure 58:
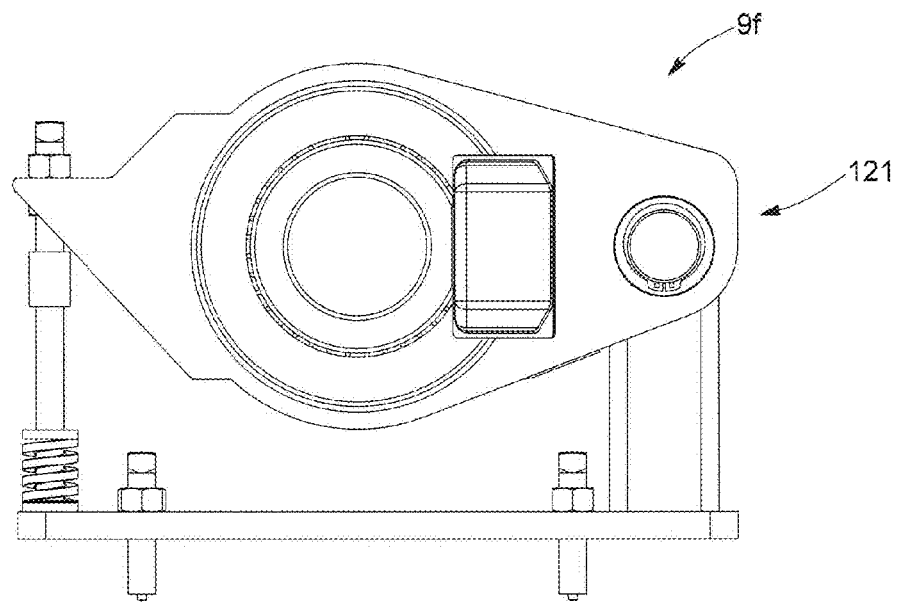
Figure 59:
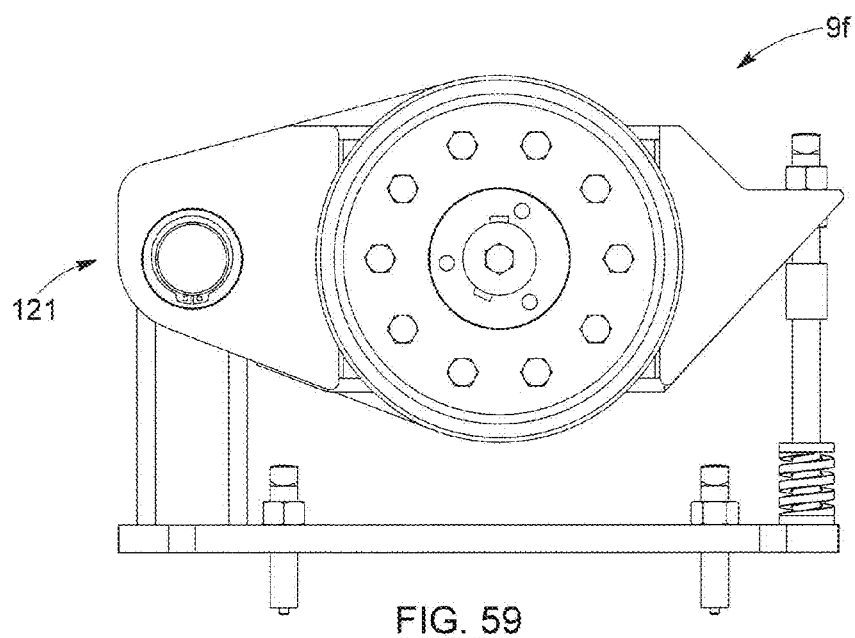
Figure 60:
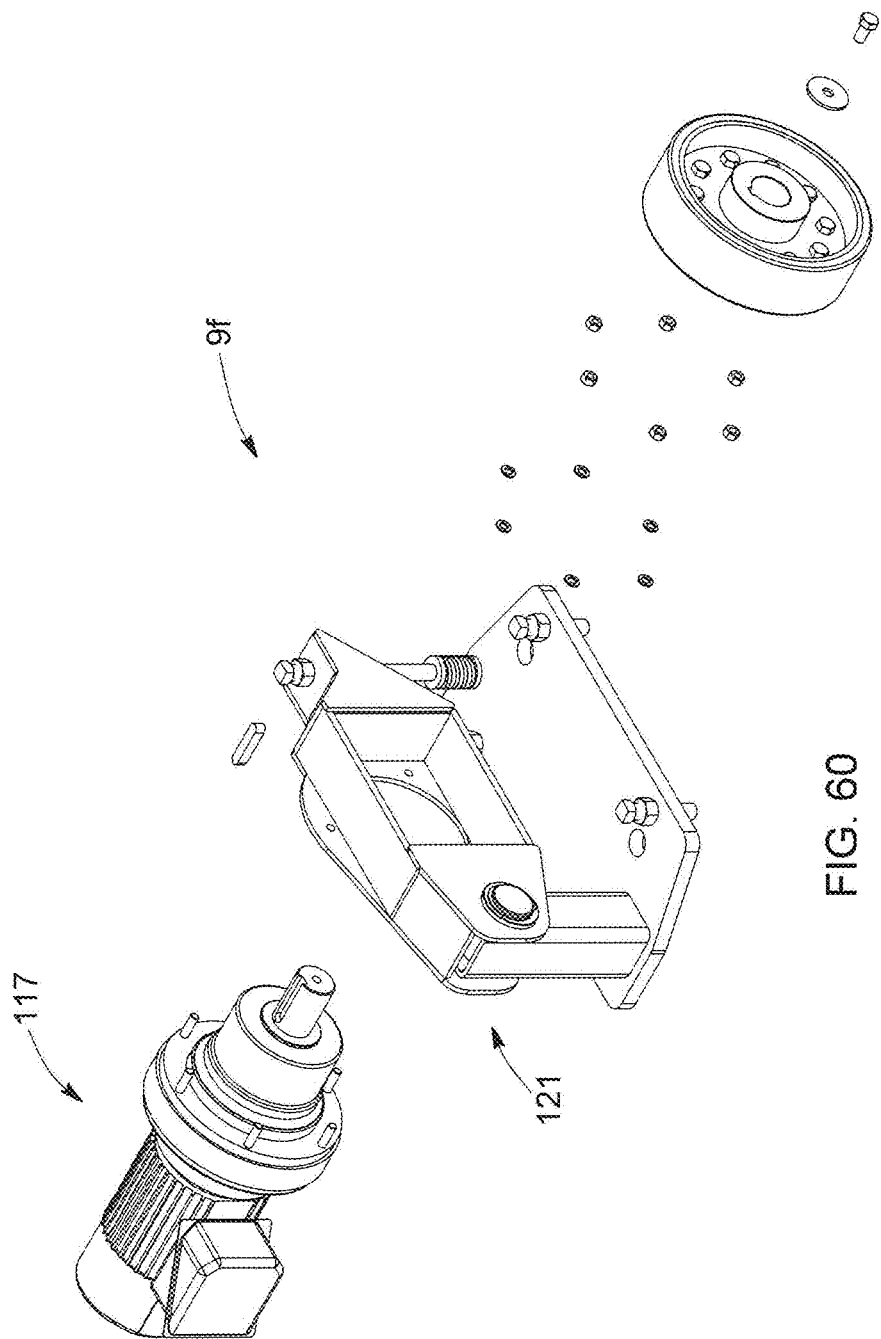

As can be easily understood when referring to FIGS. 11, 44 and 49, each wheel assembly (9a) is mounted onto the base template (107) so as to overlap two neighboring sectional pieces (107a) of the base template (107).

Preferably, and as better shown in FIGS. 11 and 50-54, a bottom part (15b) of each vertical portion (15) of each sectional segment (13) is provided with at least one bottom plate (113), said bottom plate (113) being configured for travelling over each wheel (53) of each wheel assembly (9a). Each bottom plate (113) may comprise at least one hole (113a) for receiving a corresponding fastener (69) to be inserted into a corresponding hole (19a) of a lower profiled plate (19) of a corresponding sectional segment (13), so as to secure the bottom plate (113) onto said lower profiled plate (19), as can be easily understood when referring to FIGS. 11, 50 and 53.

Preferably also, each bottom plate (113) is provided with an abutment flange (115) for abutting against a corresponding bumper portion (65) of a wheel (53) of a wheel assembly (9a) of the rotary milking station (1). According to a preferred embodiment of the preset invention, each bottom plate (113) comprises at least one guiding slit (113b) for receiving a corresponding insert (115a) of the abutment flange (115) to be mounted onto the bottom plate (113), and the bottom plate (113) and the abutment flange (115) are then secured onto one another by a corresponding process, such as welding, for example.

Preferably also, each abutment flange (115) of a given bottom plate (113) is connected to another abutment flange (115) of a neighboring bottom plate (113) by means of at least one interconnecting component (45d), and according to another preferred aspect of the present invention, each bottom plate (113) overlaps a bottom part (15b) of two neighboring vertical portions (15) of two corresponding neighboring sectional segments (13), as can be easily understood when referring to FIG. 11, for example.

Similarly to other components of the present rotary milking station (1), each bottom plate (113) is preferably formed with high-precision laser cutting.

According to another preferred aspect of the present invention, and as better shown in FIGS. 53-60, the rotary milking station (1) comprises at least one motorized-wheel assembly (9f), the motorized-wheel assembly (9f) including a motor (117) for selectively driving a corresponding motorized-wheel (119), the motorized-wheel assembly (9f) being operable between an engaged configuration where the motorized-wheel (119) is engaged with a bottom portion of the carrousel (11) for driving the same, and a disengaged configuration where the motorized-wheel assembly (9f) is disengaged from the carrousel (11).

Preferably, the motorized-wheel assembly (9f) is operable between the engaged and disengaged configurations via a corresponding pivot assembly (121), as better shown in FIGS. 55-60, and the pivot assembly (121) is provided with a complementary assembly selected from the group consisting of suspension assembly (9b), preload assembly (9c), height-adjustment assembly (9d) and/or height-displacement assembly (9e). Indeed, it is worth mentioning that according to a preferred embodiment of the present invention, several components and features of the wheel assembly (9a) and of the motorized-wheel assembly (9f) are made to be similar, or even identical, for enabling an interchangeability of components between said two assemblies (9a,9f) or within the rotary milking station (1) itself.

As aforementioned, and according to a preferred aspect of the present invention, there is provided a method for assembling a rotary milking station (1) such as the one briefly described herein and such as the one exemplified in the accompanying drawings. The method preferably comprises the steps of: a) providing a base (3) having a circular path (5) disposed about a given center (7); and b) mounting a carrousel (11) in a rotatable manner with respect to said base (3). Preferably also, step a) comprises the step of assembling a base template (107) to be securely mounted onto a fixed structure (109) of the base (3) for defining the circular path (5) and for defining the positioning of components of the driving assembly (9) about said circular path (5), the base template (107) being made of sectional pieces (107a) configured to be assembled to one another so as to form the base template (107).

Important preferred aspects of the present invention which enable it to distinguish itself from the prior art reside in the fact that the present milking station preferably comprises a structure composed of at least one plate, the presence of a suspension system, the position of its components and their assembling, the absence of "I" or "H" beams composing the structure of the carrousel, the particular form of the wheel assembly and the short installation time required at customer's site.

Indeed, the wheel assembly according to the present invention preferably guides the carousel in two directions, namely a vertical one and a horizontal one. Preferably also, suitable guiding means are provided to the system in order to ensure proper rotation or operation of the carousel with the respect to the base. For example, and as exemplified in the accompanying drawings, a corresponding guiding assembly (guide, flange, ramp, etc.) may be provided on the carrousel itself to ensure that the wheels are kept maintained along a desirable configuration during operation of the carrousel. Alternatively, the shape of the wheels could be altered so that they would engage a corresponding and/or complementary track. Of course, other suitable interactions between carrousel, wheel(s), base and/or any other corresponding components of the system could be used depending on the desired end results, as apparent to a person skilled in the art. Furthermore, and according to a preferred embodiment of the present invention, each wheel enables a considerable reduction of friction and of energy consumption for the driving or rotation of the carousel. For example, if one compares the energy required for a 50-cow carrousel, carrousels of the prior art, due to their design and associated drawbacks, typically need to employ a 5 HP ("horse power") electric motor, that is, 10 times the energy needed for a carousel having components and features according to the present invention where only a 0.5 HP ("horse power") electric motor would be required for its proper operation. On a long term consideration, the energy saving is really significant and is a major advantage for a customer/user of the present system, and for the global effort of energy saving.

According to a preferred embodiment of the present invention, and as can be easily from the aforementioned, the wheels are stationary and adjustable to be easily and perfectly aligned in an accurate circular pattern using a specially designed alignment tooling (could be a jig or a template, for example). Preferably also, the wheels are installed with a taper roller bearing to obtain a high rigidity and stability of the wheel axis. Such an accurate assembly and/or an adjustment method permits to obtain long life wheel alignment reliability, and low friction on wheel rotation in order to maintain low energy consumption. Indeed, it is known that a little misalignment of the wheels will easily double the torque needed to have the platform turning, and this is usually what happens with conventional systems.

Moreover, according to the present invention, the large wheel diameter contributes to reduce friction and wear, to reduce rolling surface imperfection effect and makes it easier to obtain stable accurate wheel alignment. Furthermore, the wheel axis is preferably not pivoting and fighting the seals that would create friction, wear and loss of energy. Also, a larger wheel diameter permits to reduce driving system rotation speed having a longer wheel circumference, and also reduces the total energy required, maintenance frequencies and associated costs. On a long time consideration, the reduction of maintenance, part replacements and carousel down time are major benefits for the customer/user of the present system.

Wheels with a replaceable laminated lining according to a preferred aspect of the present invention is a big advantage also in comparison with steel wheels of the prior art, giving a longer life to each wheel, eliminating wear of the rotating platform contact surface, reducing maintenance and giving a longer life to the entire rotary milking system.

The present invention is also advantageous in that it is also possible to install a specially designed series of plates connected together like a puzzle on the circular fixed base before installing the wheels. This is preferably done using the above-described base template and corresponding sectional pieces. This component preferably lies between the concrete of the fixed base and the wheel bases, and once fully assembled, is perfectly round and concentric with respect to the exact parlor rotation center point. On these templates, taper holes are already machined with high accuracy to receive the localization taper pins of the wheel bases and perfectly align them with the exact parlor rotation center point. This feature permits to significantly speed up installation on site while maintaining high wheel alignment accuracy.

Another substantial advantage of the present invention is the installation time that is about 5 times faster than what is possible with conventional carousels. For example, for a 50-cow carousel with the design according to the prior art, it takes about 96 days for a man for the construction. For a carousel made according to the present invention, it takes only about 17 days for a man to assemble the carousel. In reality, the carousel itself without the milking equipment is assembled in just 2 days by a little team. This installation time reduction is a major improvement in the field and for customers.

Another big advantage of the present wheel attachment is a system allowing the lowering of each wheel individually from its contact surface without changing any alignment or adjustment. That possibility to move the wheel axle permits to operate all the maintenance actions and adjustments from one side of the parlor. The preferred mechanism consist in a cam assembly operated from the same side than the maintenance actions, lowering the wheel axle to avoid any contact between the wheel itself and its contact surface with the carrousel. Furthermore, greasing, bearing adjustment, alignment and/or other maintenance actions are possible from one side, which is also advantageous. The preferred cam system is not a limitation and any other installation allowing releasing the contact between the wheel and its contact surface is intended to be covered by the present application, as can be easily understood by a person skilled in the art. The present of such a disengagement assembly according to the present invention is a great improvement for the maintenance of the carousel, reducing down time and in some cases, simply enabling maintenance itself.

Preferably also, the wheel attachment system, wheel shape, suspension shape and capacity, are fully adaptable according to customer preference(s) and allow maintenance or replacement from the inside or the outside of the circular system base. The wheels adjustment, alignment, servicing and/or replacement is still possible after installation. Indeed, the cam system described herein permits to lower a wheel out of rotating platform for servicing.

As may be better appreciated by a person skilled in the art in view of the accompanying drawings, and according to a preferred aspect of the present invention, the main structure of the carousel is preferably composed of a succession of sectional plates shaped by bending under press. For example, the accompanying drawings show various examples of a plate constituting a section of the carousel. This preferred assembling method is a considerable advantage in comparison with the prior art, transferring a big part of the construction and installation work to a controlled fabrication facility. Furthermore, quality and accuracy are substantially improved, and a resulting shorter installation time on site is a big advantage for the customer in case of milking method transition.

The shape of the plate itself eliminates the need for the rolled or curved "I" beam used as a contact surface for wheel in the prior art, eliminating one of the biggest problems of standard parlors in the prior art.

Figure 21:
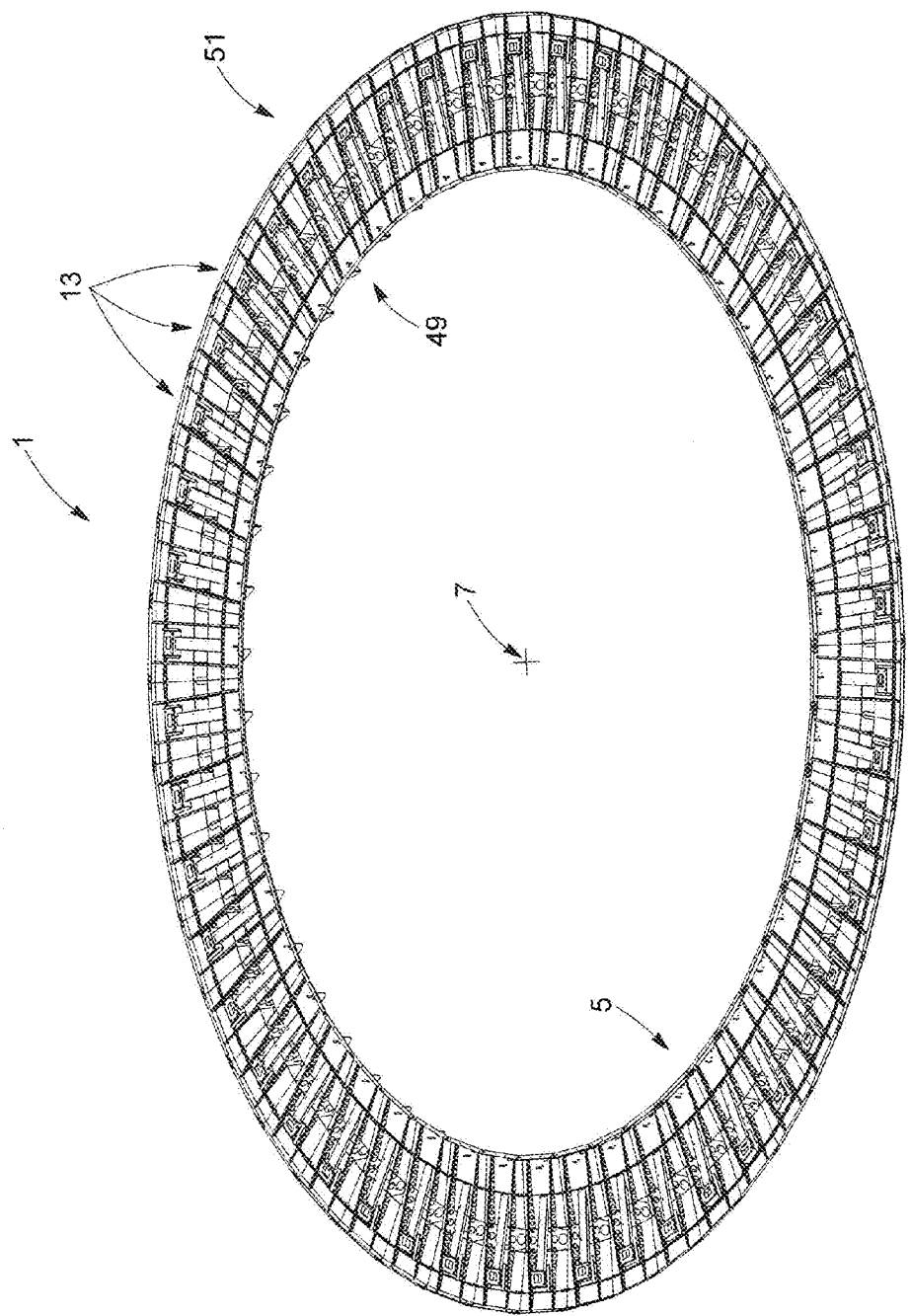
Figure 22:
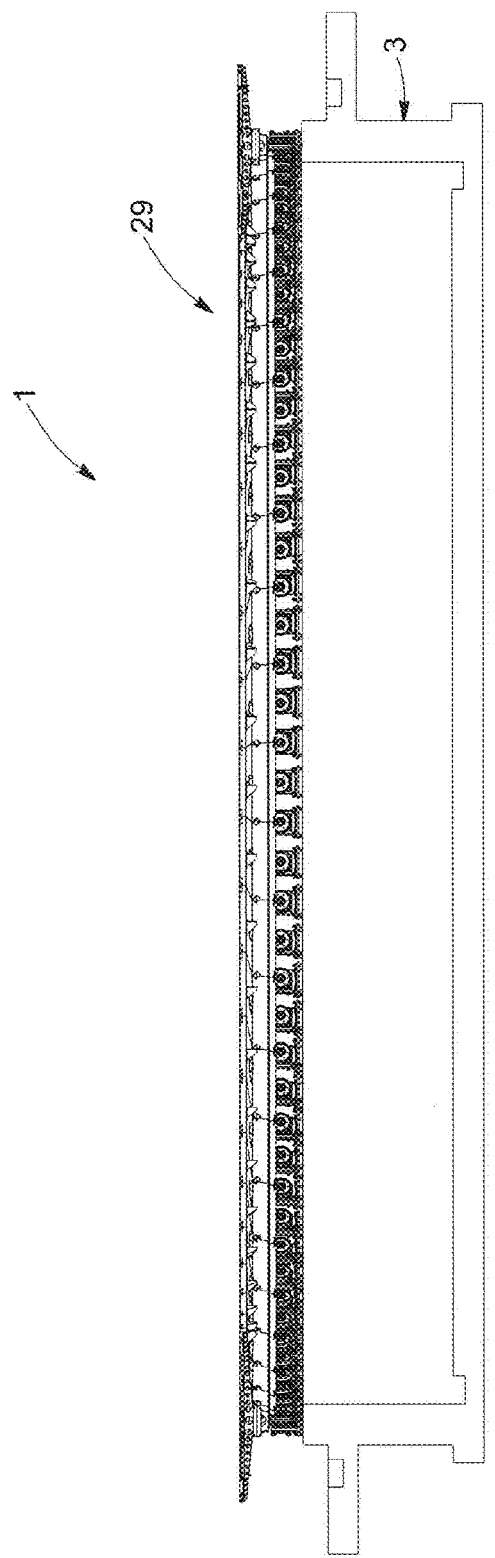

Each of the plates is preferably assembled at their extremities and at their center by suitable fastening/interconnecting devices or methods in order to form a rigid and unique assembly. For example, FIG. 21 shows an isometric view of the ensemble of a milking carousel according to a preferred embodiment of the present invention, whereas FIG. 22 shows a side view of the overall assembly according to a preferred embodiment of the present invention. The accompanying figures not only show isometric views of a possible sectional segment and a proposition of reinforcement before adding concrete, but also various possible positions of assembly points of the sectional segments.

Figure 2:
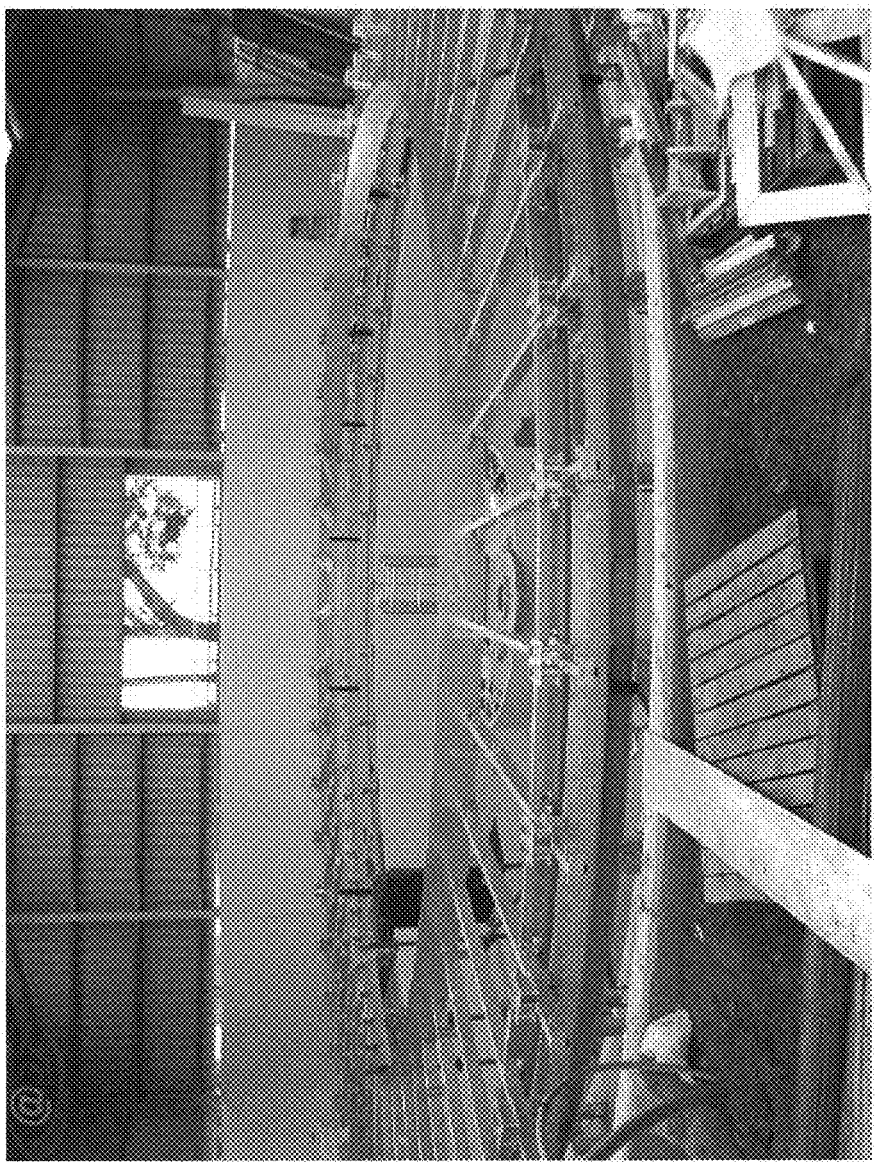
Figure 3B:
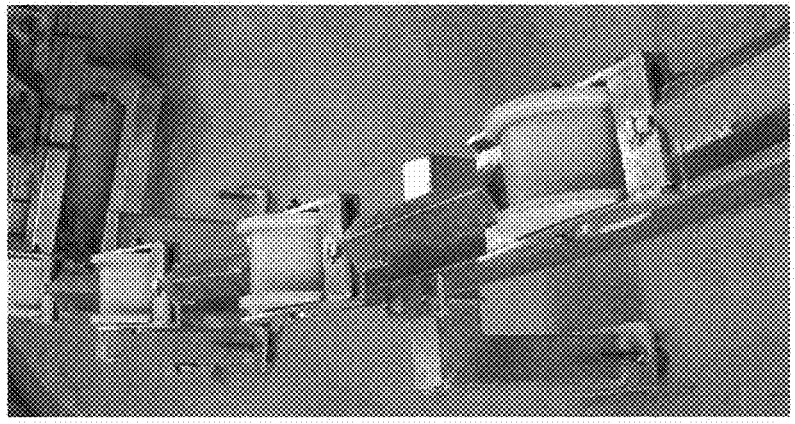
Figure 3A:
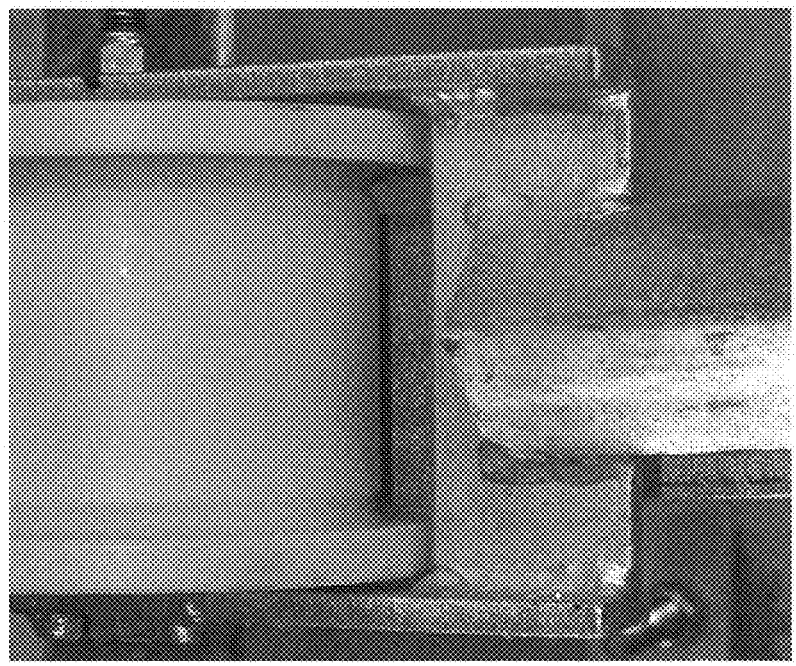
Figure 4:
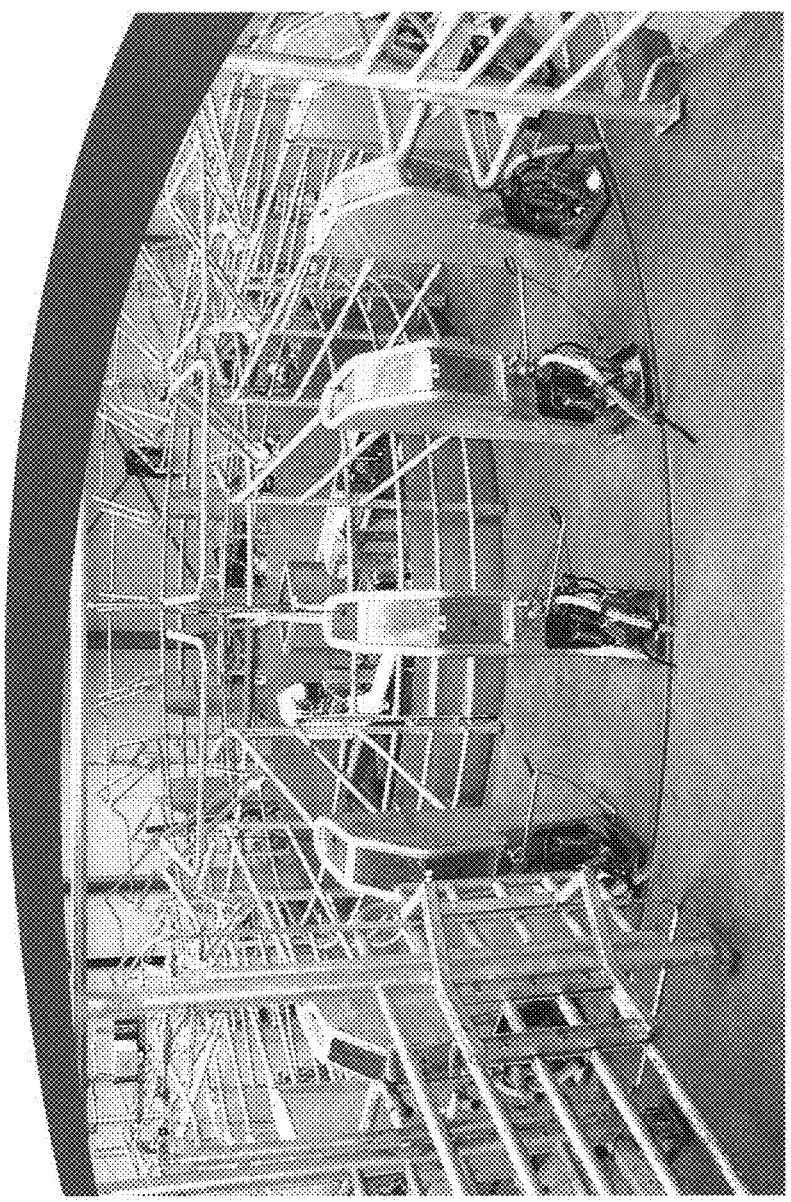
Figure 5:
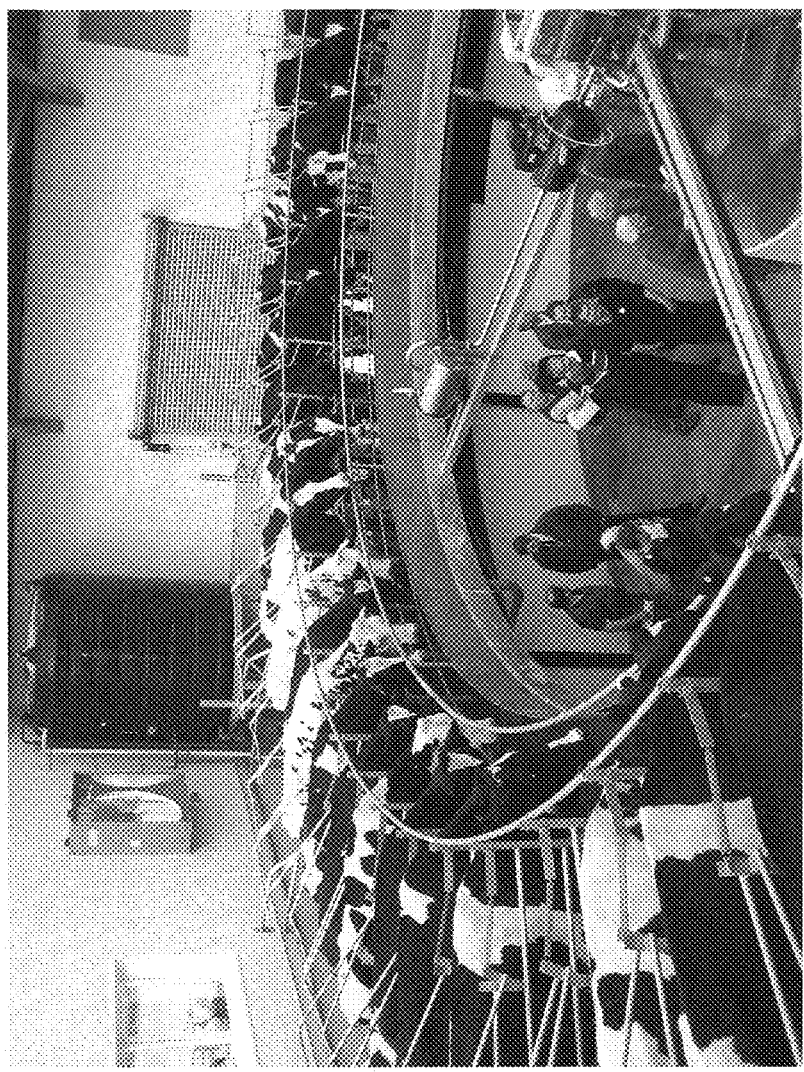
Figure 6:
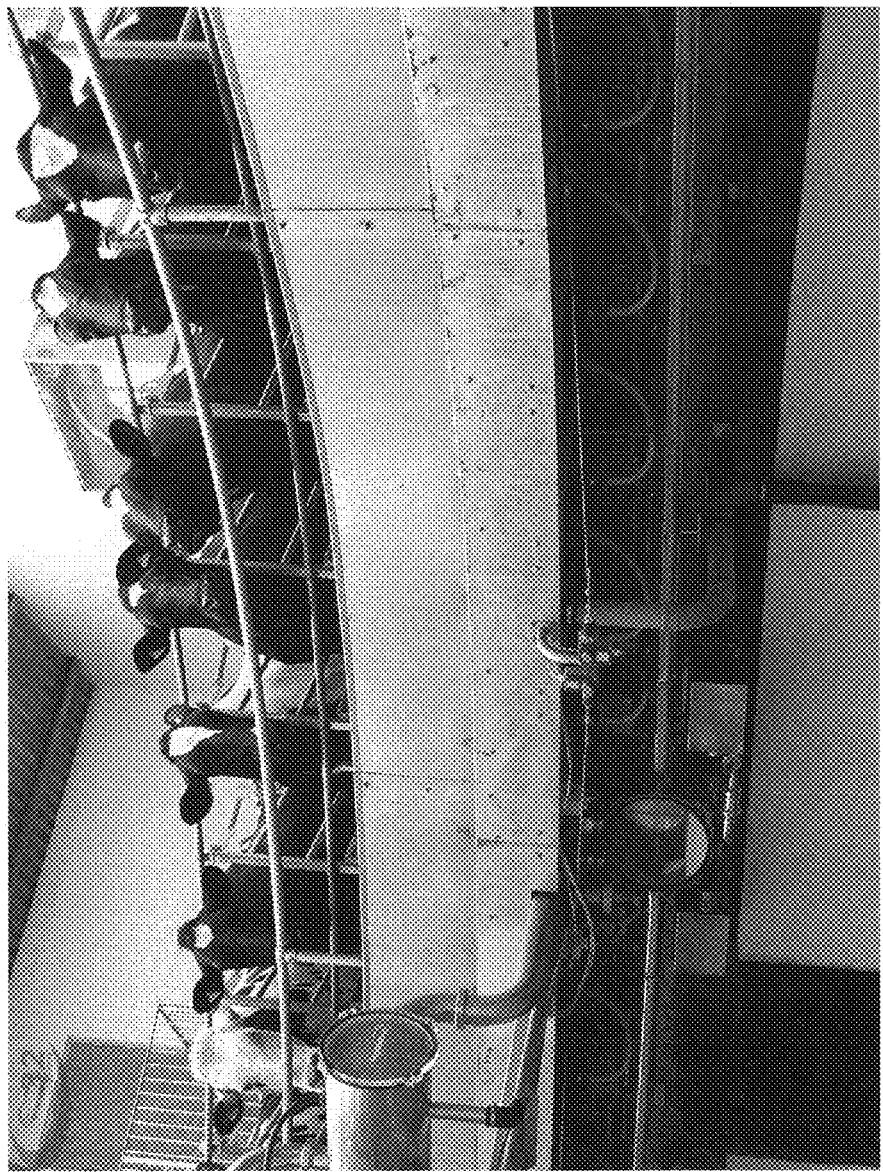
Figure 7:
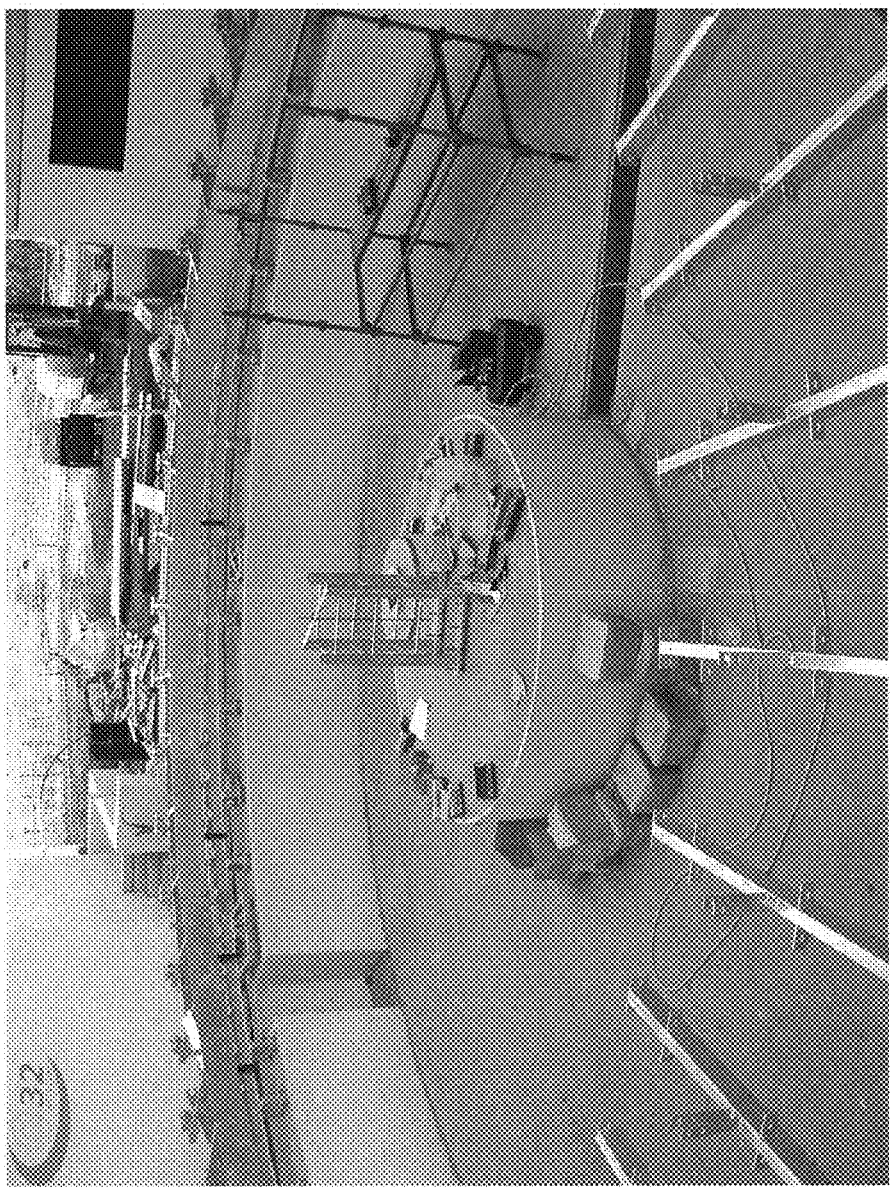
Figure 8:
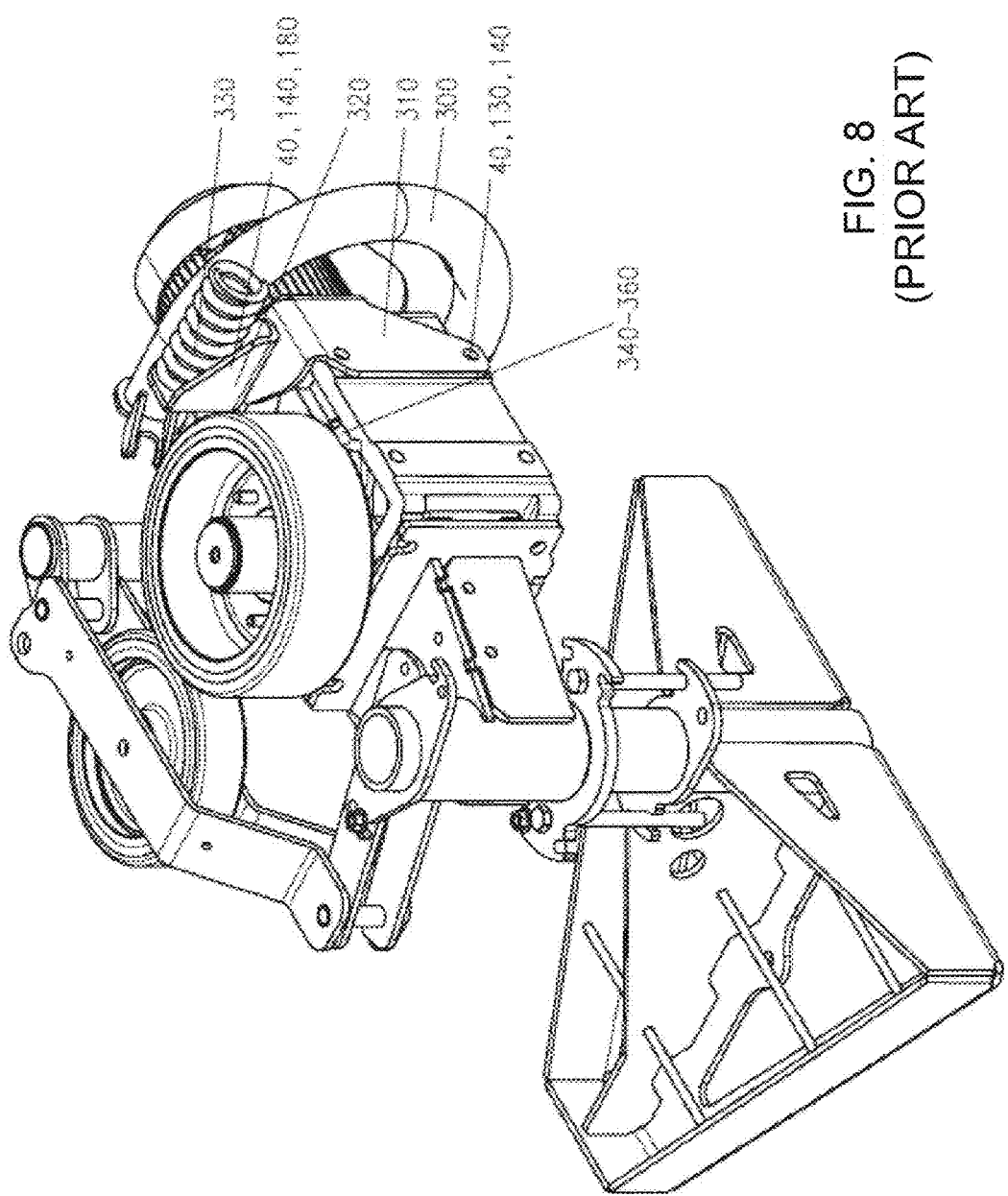
Figure 9:
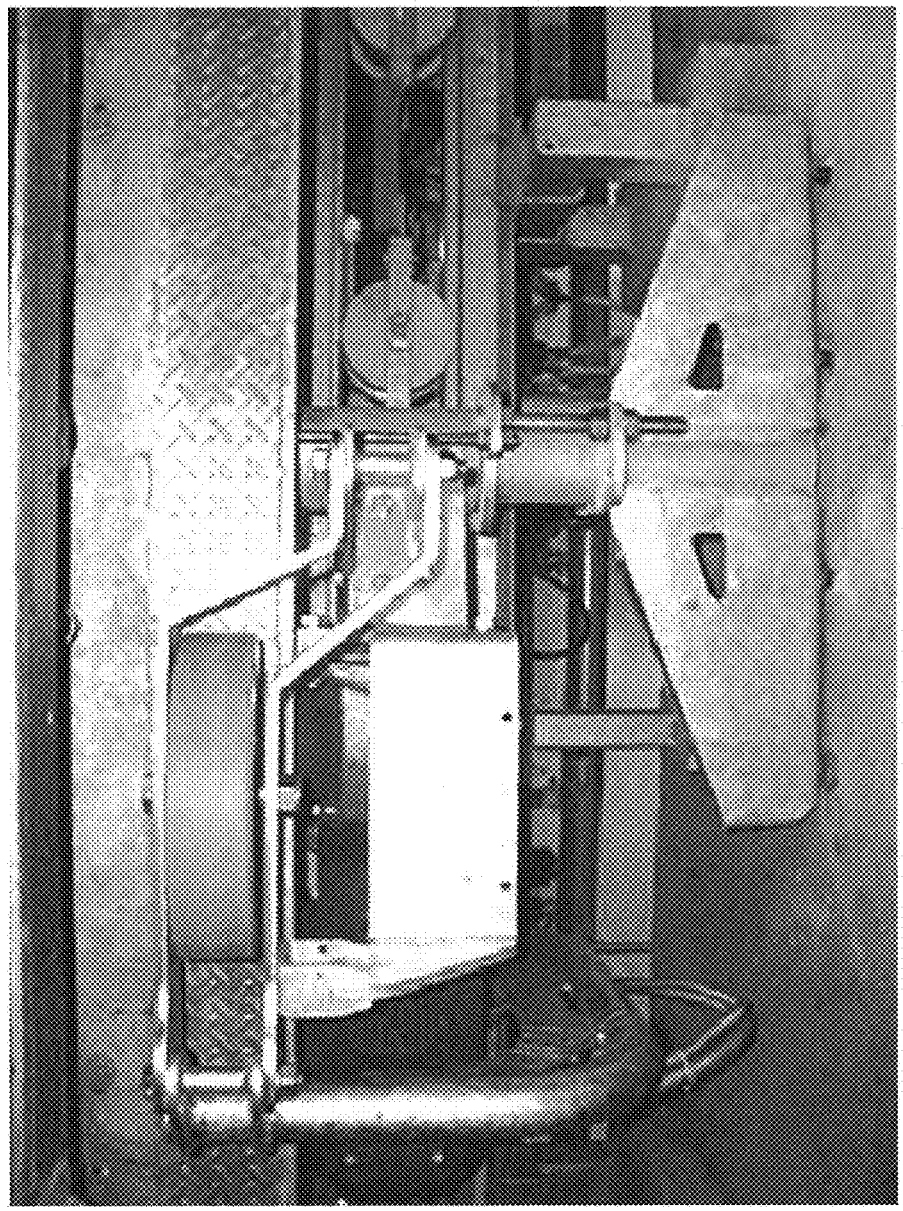
Figure 10:
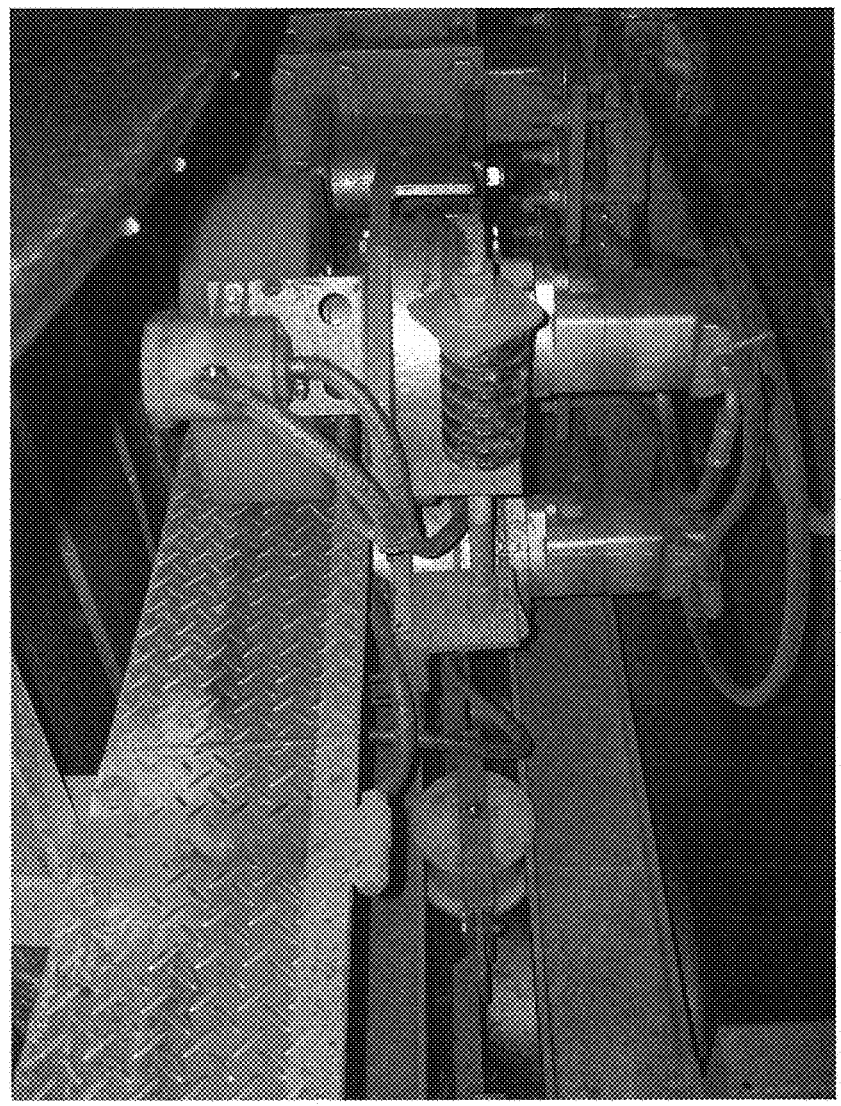

Indeed, the assembly which would normally result from what is done in the prior art, as shown in FIGS. 2 and 7, is therefore replaced by a simplified, lighter and considerably more precise structure, as exemplified in FIGS. 21 and 22, for example.

Once this structure is completed, the ensemble is preferably filled with concrete or any other suitable material in order to create a floor capable of supporting animals during their transportations all along the process of milking or processing, as can be easily understood when referring to FIGS.

Figure 23:
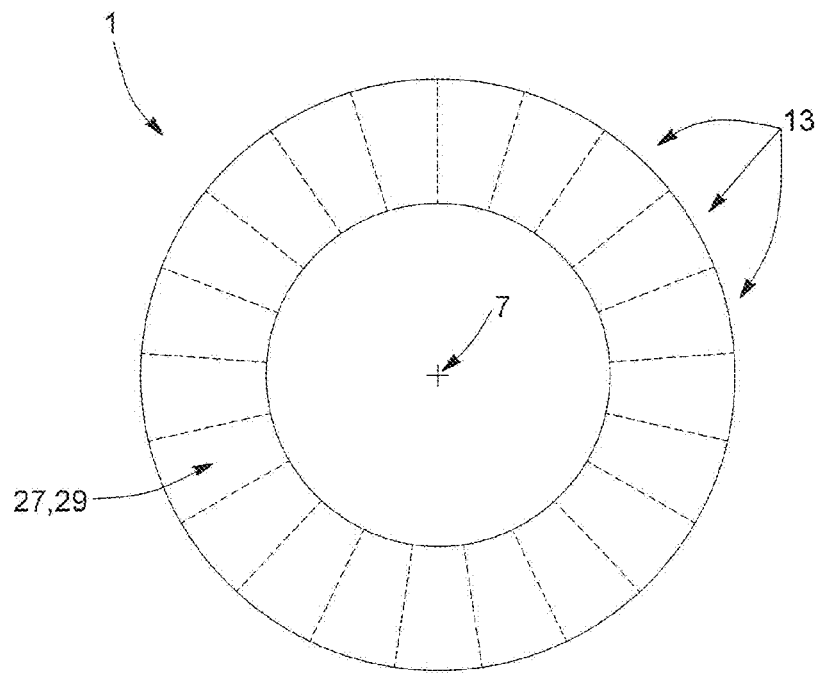
Figure 24:
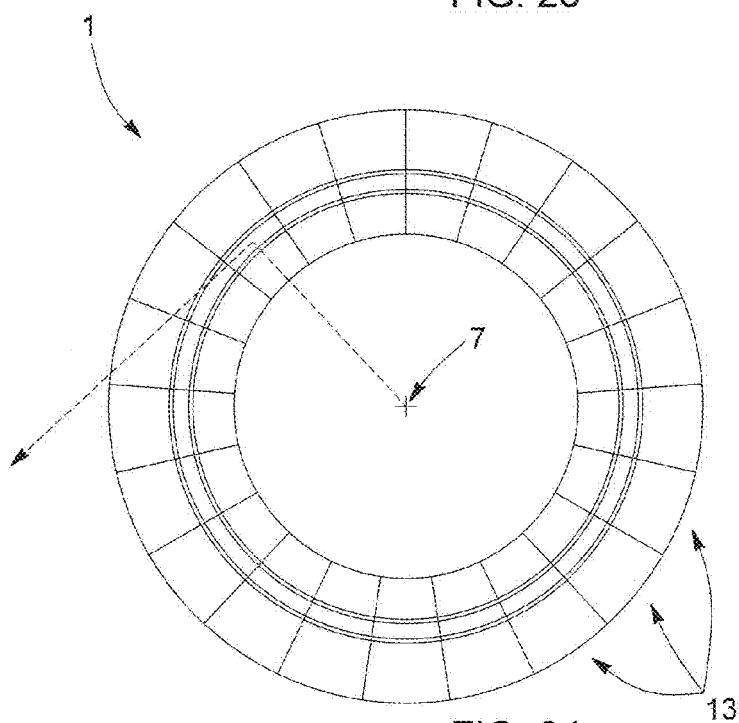
Figure 25:
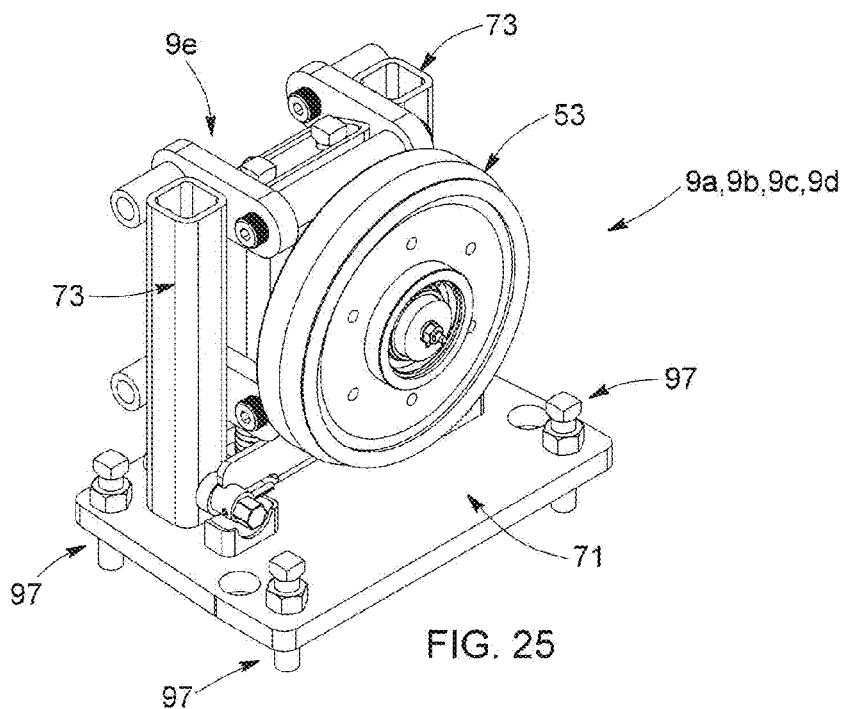
Figure 26:
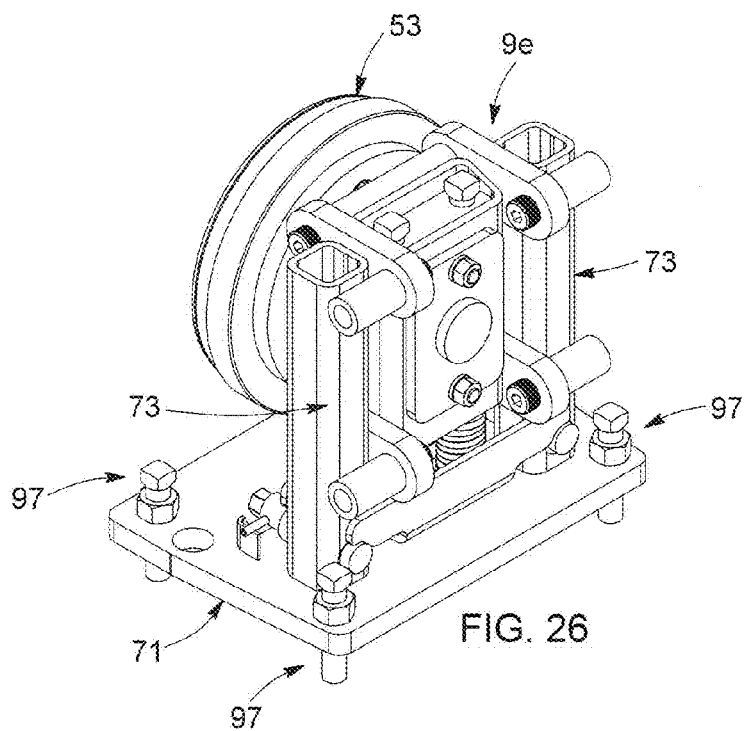
Figure 27:
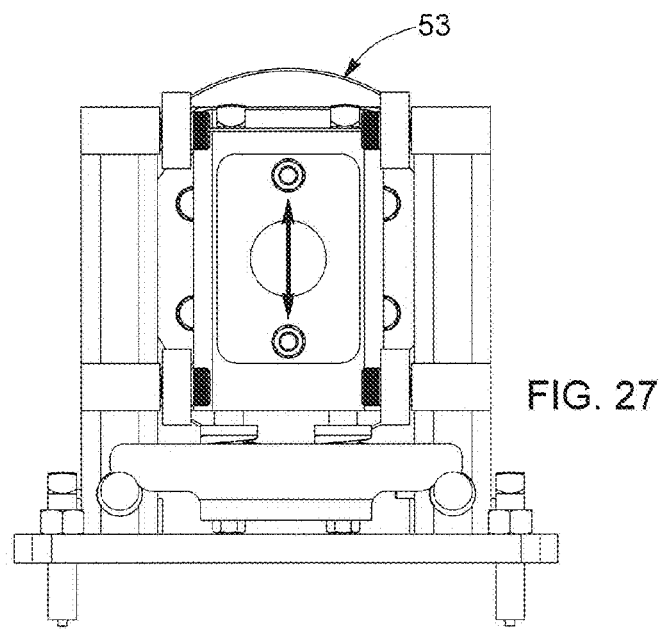
Figure 28:
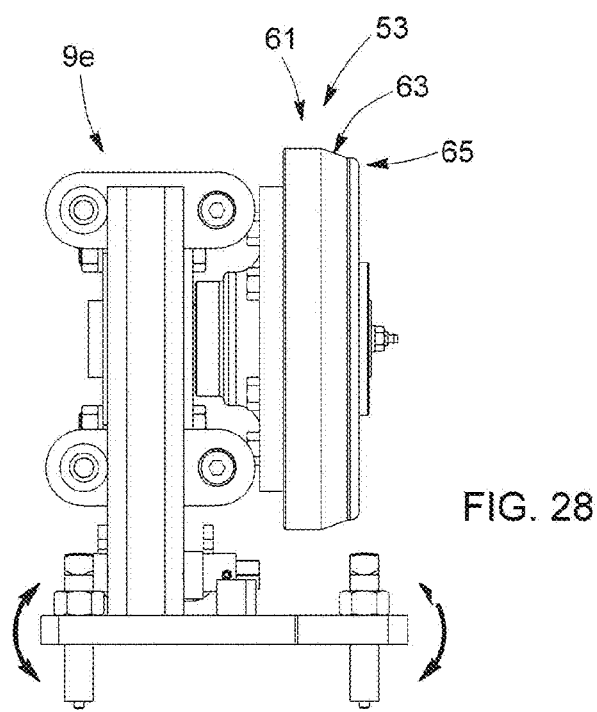
Figure 29:
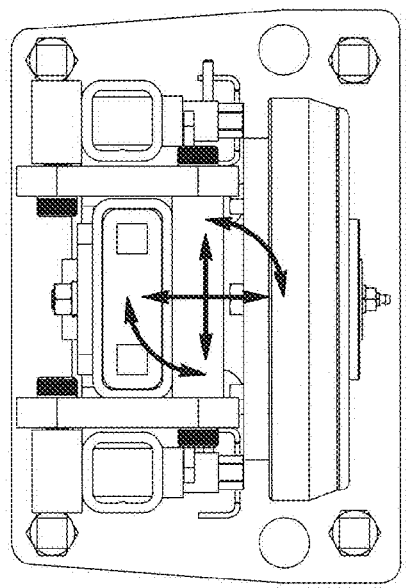
Figure 30:
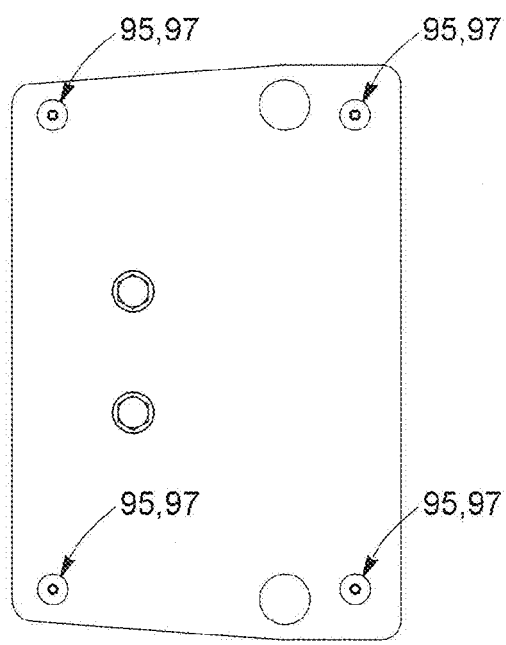
Figure 31:
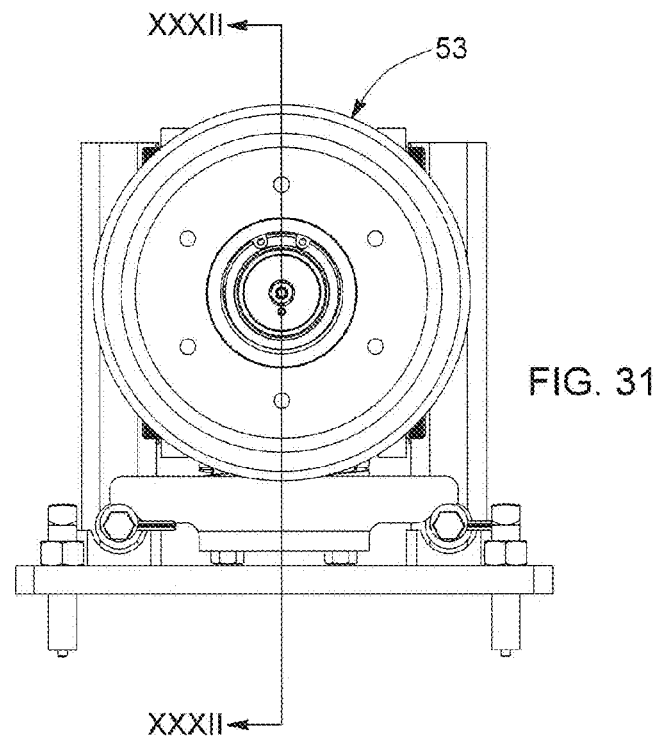
Figure 32:
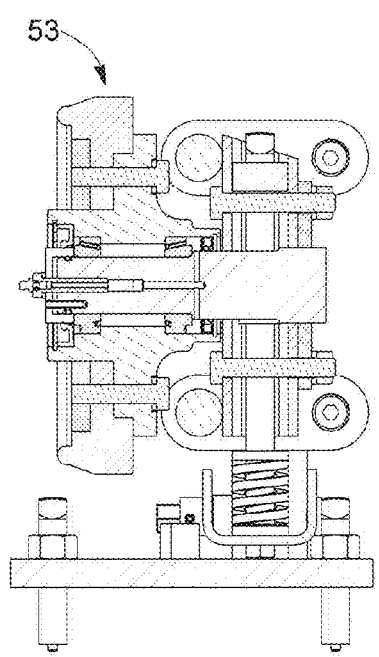

23 and 24 showing respectively top and bottom schematic representations of a carrousel according to the present invention, dotted lines in FIG. 23 being used to designate a delimitation between neighbouring sectional segments under the concrete. According to the preferred assembly method, the concrete, or any other suitable material, can be poured in the structure from one position by activating the parlor rotation in the intention to apply a balanced weight on the assembly.

In order to ensure a uniform and proper distribution of loads on each of the wheels supporting the structure, a suspension system enables the wheels to displace themselves while being loaded and in use, as can be easily understood by a person skilled in the art when referring to the accompanying drawings and in view of the above description.

With respect to the suspension system assembly of the wheels, it preferably comprises three sections according to a preferred embodiment of the present invention, namely: a) a base which is preferably fixed once the positioning is determined in relation to the center of the carousel; b) a mobile portion where the hub is inserted, supporting the wheel; and c) a rotary wheel assembly (hub, wheel, etc.).

Furthermore, FIGS. 25-31 show possible ranges of motions during the installation of the wheel sub-assembly (i.e. wheel) on the fixed base of the carousel. These latter possible movements are adjusted and tightened at installation, once each wheel is positioned correctly in relation to the center of the carousel (thus, forming a circle). Preferably also, each wheel is adjusted by positioning its axis so that it coincides with the exact center of the parlor. Once the ensemble of wheels is properly installed, the vertical movement is the only movement which is preferably left to be possible, as can be easily understood when referring to FIG. 27.

The assembly of the wheel system is preferably composed of a base and a mobile sub-assembly section. The latter preferably comprises the wheel(s). Each of the wheels is thus free to adapt itself to the necessary vertical movement under loading and possible deviations of the carrousel. Preferably, the platform rotation is driven by one or many friction wheels or motorized-wheels depending on the parlor size. The friction drive wheel is preferably driven by an electric motor equipped with a brake system and speed reducer. Preferably also, each drive wheel replaces a suspension wheel on the circle path and is equipped with a suspension system. Preferably also, the drive wheel support is also properly aligned according to the exact center of parlor rotation. This preferred design eliminates many driving components using the same installation base than the suspension wheels, applying the friction to the exact same contact surface than the suspension wheels, having an integrated brake system and reducing the installation steps when compared to conventional systems of the prior art.

The above-described preferred design makes it easier to service the entire drive system. Preferably also, wiper blades are installed each side of the drive wheels to clean the contact surface and maintain a dry non-slippery contact surface.

In order to enable the proper operation of the equipment in its whole, different cables and conduits must pass from the interior to the exterior of the carousel. The accompanying figures exemplify possible positions of assembly points of the sections, and the possible cutting or through-holes which may be made in the plates at the desired locations.

The accompanying figures exemplify also show different views of a section and proposed reinforcement(s) before the addition of concrete, as well as the possible methods in order to solidify the platform of the carousel by means of steel reinforcement bars. Subsequently, the concrete may be poured into the mechanically welded or bolted structure.

The milking station according to the present invention is preferably devised so as to conform with the requirements of most security standards.

Preferably, the components of the milking station according to the present invention are made of suitable metallic materials, such as steel for example, or any other suitable materials, for properly sustaining the different loads to which the station may be subjected to and other parameters to be considered, as apparent to a person skilled in the art.

As can be easily understood by a person skilled in the art, in view of the present description and the accompanying drawings, various other modifications and/or additions could be made to the milking station without departing from the scope of the present invention. For example, and in order to obtain the same features and advantages which are intended by the present invention, it would be possible to modify the milking station so as to: a) form the plates by hydraulic pressure instead of by bent plates; b) link each of the plates by any other appropriate assembling methods (welding, gluing, nesting, clipping, etc.); c) modifying the ensemble of the carousel and/or each of the sections or of the plates by the use of reinforcement components or any other method enabling to provide more rigidity or more flexibility to the ensemble of the overall structure; d) carrying out the same concept of a mobile wheel axle without the use of an off-center axle; e) using a method or system other than the springs for producing the possible movement of each of the wheels along a vertical direction; and f) using the same design principles of the invention without enabling a liberty of movement or range of motion for the wheel supporting the carousel.

It is worth mentioning also that it would be possible to carry out the same present invention by accumulating different sections and developing a rotary mobile platform for a small or a great number of animals, and other modifications and/or variants that are possible according to the present invention reside in the driving or rotating of the carousel by any other suitable method, or by using the same methods known in the prior art.

As may now be appreciated, the present invention is a substantial improvement over the milking stations of the prior art in that, by virtue of its design and components, as briefly explained herein, the rotary milking station according to the present invention, to overcomes several of the aforementioned prior art problems, providing for an easier, more accurate, more functional and more versatile system.

Although preferred embodiments of the present invention have been briefly described herein and illustrated in the accompanying drawings, it is to be understood that the invention is not limited to these embodiments and that various changes and modifications could be made without departing form the scope and spirit of the present invention, as defined in the appended claims.

The invention claimed is:

1. A rotary milking station for milking applications, the rotary milking station comprising:
a base having a circular path disposed about a given center;
a driving assembly operatively mountable onto the base so as to be disposed about the circular path of the base;
a carousel operatively mountable onto the driving assembly, the carousel being made out of sectional segments, each sectional segment having a lower protruding vertical portion and a pair of flange portions each projecting from a corresponding side of the vertical portion , the sectional segments being interconnected to another so as to define the carrousel, the vertical portions of the sectional segments being positioned, shaped and sized so as to be disposed along the circular path of the base and for cooperating with the driving assembly in order to enable the carrousel to be rotatably moveable with respect to the base; and a plurality of wheel assemblies disposed about the circular path of the base, each wheel assembly comprising at least one rotatable wheel for operatively supporting thereon a portion of the carrousel the wheel assemblies being configured for allowing the carrousel to rotate with respect to the circular path over said wheels, wherein each wheel assembly comprises:

a base;

at least one supporting post; and a wheel peratively mounted onto said at least one supporting post, and being vertically moveable with respect to the base via a displacement assembly, and wherein the displacement assembly comprises:

at least one lower supporting arm, each lower supporting arm having a first end hingedly connected to a corresponding supporting post and a second end rotatably moveable with respect to its first end;

at least one upper supporting arm, each upper supporting arm having a first end hingedly connected to a corresponding supporting post and a second end rotatably moveable with respect to its first end, and a mounting assembly securely connectable onto the second ends of each upper and lower supporting arms so as to be vertically moveable with said arms, each wheel being mountable onto the mounting assembly so as to be vertically moveable with respect to the base in accordance with a movement of the supporting arms.

2. A rotary milking station according to claim 1, wherein the vertical portion of each sectional segment has a substantially trapezoidal shape.

3. A rotary milking station according, to claim 1, wherein the vertical portion of each sectional segment is tapered downwardly.

4. A rotary milking station according to claim 1, wherein the vertical portion of each sectional segment is the main load-bearing structural portion of the sectional segment.

5. A rotary milking station according to claim 1, wherein each sectional segment comprises a lower profiled plate having a cavity with a pair of opposite rims, said lower profiled plate defining a bottom contour of the vertical portion and of the flange portions of the sectional segment.

6. A rotary milking station according to claim 5, wherein the cavity of each lower profiled plate of each sectional segment is positioned, shaped and sized for receiving a corresponding filling construction material therein, so that once said filling construction material has hardened within the cavity, each sectional segment comprises a substantially leveled upper surface.

7. A rotary milking station according to claim 6, wherein the upper surfaces of the sectional segments are substantially flush with one another so as to provide the carrousel with a substantially leveled overall working surface.

8. A rotary milking station according to claim 5, wherein each lower profiled plate is a plate formed with high-precision laser cutting.

9. A rotary milking station according to claim 5, wherein each lower profiled plate is a unitary plate having been bent along different segments so as to define the vertical portion and the flange portions of each corresponding sectional segment.

10. A rotary milking station according to claim 9, wherein each unitary plate has been further bent along other different segments so as to define the opposite rims of the sectional segment.

11. A rotary milking station according to claim 5, wherein each rim of a given sectional segment of the carrousel is connected to another rim of a neighboring sectional segment of the carrousel via at least one interconnecting component.

12. A rotary milking station according to claim 1, wherein each sectional segment comprises at least one reinforcement component, each reinforcement component being disposed within a cavity of a lower profiled plate so as to provide a corresponding reinforcement to the sectional segment.

13. A rotary milking station according to claim 12, wherein said at least one reinforcement component comprises a pair of reinforcement components.

14. A rotary milking station according to claim 12, wherein each reinforcement component spans across both corresponding flange portions of a given sectional segment.

15. A rotary milking station according to claim 12, wherein each reinforcement component spans between opposite rims of a corresponding lower profiled plate of a given sectional segment.

16. A rotary milking station according to claim 12, wherein each reinforcement component is complementary in shape to that of a given sectional segment, and comprises a lower protruding vertical component and a pair of flange components, each flange component projecting from a corresponding side of the vertical component.

17. A rotary milking station according to claim 16, wherein a cross-sectional section of the vertical component and a cross-sectional section of the vertical portion are substantially aligned within a same plane.

18. A rotary milking station according to claim 16, wherein the vertical component of each reinforcement component is nested within the vertical portion of the given sectional segment.

19. A rotary milking station according to claim 12, wherein each reinforcement component is a reinforcement truss provided with a plurality of orifices being positioned, shaped and sized so as to reduce an overall weight of the reinforcement truss while maintaining the structural integrity thereof.

20. A rotary milking station according to claim 12, wherein each reinforcement component has a length being substantially parallel to a length of the vertical portion of a given sectional segment.

21. A rotary milking station according to claim 12, wherein each reinforcement component spans between lateral sides of each flange portion of a given sectional segment.

22. A rotary milking station according to claim 12, wherein each reinforcement component further comprises reinforcement meshing disposed with the cavity of a given sectional segment.

23. A rotary milking station according to claim 12, wherein each reinforcement component of a given sectional segment of the carrousel is connected to another reinforcement component of a neighboring sectional segment of the carrousel via at least one interconnecting component.

24. A rotary milking station according to claim 1, wherein each vertical portion of a given sectional segment of the carrousel is connected to another vertical portion of a neighboring sectional segment of the carrousel via at least one interconnecting component.

25. A rotary milking station according to claim 1, wherein at least one given portion of each sectional segment comprises a through-channel extending from a first side of the sectional segment to a second side thereof.

26. A rotary milking station according to claim 1, wherein the driving assembly of the rotary milking station comprises at least one assembly selected from the group consisting of wheel assembly, suspension assembly, preload assembly, height-adjustment assembly, height-displacement assembly and motorized-wheel assembly.

27. A rotary milking station according to claim 26, wherein each wheel assembly is provided with a corresponding preload assembly.

28. A rotary milking station according to claim 27, wherein each preload assembly comprises at least one spring operatively disposed between the base of the wheel assembly and a bottom mounting component of the wheel, each spring having a given preload selected in accordance with a corresponding weight to be put on each sectional segment of the rotary milking station.

29. A rotary milking station according to claim 26, wherein each wheel assembly is provided with a corresponding height-adjustment assembly for adjusting a height of the base of the wheel assembly with respect to the base of the rotary milking station, each height-adjustment assembly comprising:
  at least one height-adjustment hole provided on the base of the wheel assembly, each height-adjustment hole being provided with inner threading;
  at least one height-adjustment fastener threadedly engaged with a corresponding height-adjustment hole via a complementary outer threading, each height-adjustment fastener having a distal pin pivotably insertable into a corresponding hole of the base of the rotary milking station and being rotatable with respect to the corresponding height-adjustment hole so that the base of the wheel assembly may be displaceable in height with respect to the base of the rotary milking station via a corresponding rotation of the height-adjustment fastener.

30. A rotary milking station according to claim 29, wherein each height-adjustment fastener is provided with a corresponding nut displaceable along said height-adjustment fastener and removably securable against the base of the wheel assembly for selectively locking the wheel assembly in place at a fixed height with respect to the base of the rotary milking station.

31. A rotary milking station according to claim 29, wherein each wheel assembly is provided with four height-adjustment holes and four corresponding height-adjustment fasteners.

32. A rotary milking station according to claim 29, wherein each height-adjustment hole also serves as a positioning hole for ensuring a proper positioning of each wheel assembly onto corresponding holes of the base of the rotary milking station.

33. A rotary milking station according to claim 1, wherein each wheel is mountable onto a corresponding axle via at least one ball-bearing disposed about the hub of the wheel.

34. A rotary milking station according to claim 33, wherein each ball-bearing is a tapered conical ball-bearing.

35. A rotary milking station according to claim 1, wherein each wheel comprises an outer peripheral rim having a slanted portion.

36. A rotary milking station according to claim 1, wherein each wheel comprises an outer peripheral rim having a frontal bumper portion.

37. A rotary milking station according to claim 1, wherein each wheel comprises a replaceable outer peripheral rim.

38. A rotary milking station according to claim 1, wherein each wheel comprises an outer peripheral rim and an inner anchoring portion, the inner anchoring portion being removably mountable between a pair of complementary components of the wheel via corresponding fasteners, and wherein the outer peripheral rim is disposed circumferentially about the complementary components when securely mounted onto one another.

39. A rotary milking station according to claim 1, wherein said at least one supporting post comprises a pair of supporting posts, wherein said at least one lower supporting arm comprises a pair of lower supporting arms, and wherein said at least one upper supporting arm comprises a pair of upper supporting arms.

40. A rotary milking station according to claim 1, wherein the mounting assembly comprises a housing provided with lower and upper cylinders, the lower cylinder having an extremity pivotably mounted onto a corresponding second end of a lower supporting arm and the upper cylinder having an extremity pivotably mounted onto a corresponding second end of an upper supporting arm.

41. A rotary milking station according to claim 40, wherein the housing comprises a bore for receiving a corresponding axle of the wheel.

42. A rotary milking station according to claim 41, wherein the axle is provided with a base bracket being removably connectable onto a back portion of the housing via corresponding fasteners.

43. A rotary milking station according to claim 1, wherein each wheel assembly is provided with a corresponding suspension assembly.

44. A rotary milking station according to claim 43, wherein each suspension assembly comprises at least one spring operatively disposed between the base of the wheel assembly and a bottom mounting component of the wheel.

45. A rotary milking station according to claim 44, wherein each spring also acts as a preload spring.

46. A rotary milking station according to claim 44, wherein the rotary milking station comprises a disengagement assembly operatively connected to each wheel assembly, each disengagement assembly including a spring support abutting against a corresponding spring, the spring support being operable between a first configuration where the corresponding spring is allowed to be operated along its effective length, and a second configuration where the spring support is biased against the spring for shortening its effective length, so as to allow a wheel of the wheel assembly to be disengaged from the carrousel.

47. A rotary milking station according to claim 46, wherein the spring support is operable between the first and second configurations via at least one cam assembly, each cam assembly having an eccentrically mounted rotatable component being cooperable with the spring support so as to raise and lower said spring support via a corresponding rotation, each cam assembly being provided with a corresponding lever.

48. A rotary milking station according to claim 1, wherein each sectional segment is supported by two wheel assemblies.

49. A rotary milking station according to claim 48, wherein each wheel assembly comprises two suspension springs.

50. A rotary milking station according to claim 1, wherein the base of the rotary milking station comprises a base template being securely mountable onto a fixed structure for defining the circular patch and for defining the positioning of components of the driving assembly about said circular path, the base template being made of sectional pieces configured to be assembled to one another so as to form the base template.

51. A rotary milking station according to claim 50, wherein each sectional piece of the base template comprises interlocking components for allowing a given sectional piece to be interlocked with corresponding first and second neighboring sectional pieces so as to form the base template.

52. A rotary milking station according to claim 51, wherein the interlocking components of each sectional piece of the base template comprises at least one tenon component on a first lateral side of the sectional piece and at least one corresponding mortise component on a second lateral side of the sectional piece.

53. A rotary milking station according to claim 50, wherein each sectional piece of the base template is a piece formed with high-precision laser cutting.

54. A rotary milking station ROM according to claim 50, wherein each sectional piece of the base template comprises at one pre-established securing hole for receiving a corresponding securing component used to secure the base template onto the base of the rotary milking station.

55. A rotary milking station according to claim 50, wherein each sectional piece of the base template comprises at one pre-established positioning hole for receiving a corresponding component of the driving assembly, for ensuring a specific positioning of the driving assembly with respect to the base template.

56. A rotary milking station according to claim 50, wherein each sectional piece of the base template comprises at least one pre-established anchoring hole for receiving a corresponding anchoring component used to cooperate with a corresponding wheel assembly.

57. A rotary milking station according to claim 50, wherein each wheel assembly is mounted onto the base template so as to overlap two neighboring sectional pieces of the base template.

58. A rotary milking station according to claim 1, wherein a bottom part of each vertical portion of each sectional segment is provided with at least one bottom plate, said bottom plate being configured for travelling over each wheel of each wheel assembly.

59. A rotary milking station according to claim 58, wherein each bottom plate comprises at least one hole for receiving a corresponding fastener to be inserted into a corresponding hole of a lower profiled plate of a corresponding sectional segment, so as to secure the bottom plate onto said lower profiled plate.

60. A rotary milking station according to claim 58, wherein said bottom plate is provided with an abutment flange for abutting against a corresponding bumper portion of a wheel of a wheel assembly of the rotary milking station.

61. A rotary milking station according to claim 60, said each bottom plate comprises at least one guiding slit for receiving a corresponding insert of the abutment flange to be mounted onto the bottom plate.

62. A rotary milking station according to claim 60, wherein each abutment flange of a given bottom plate is connected to another abutment flange of a neighboring bottom plate via at least one interconnecting component.

63. A rotary milking station according to claim 58, wherein each bottom plate overlaps a bottom part of two neighboring vertical portions of two corresponding neighboring sectional segments.

64. A rotary milking station according to claim 58, wherein each bottom plate is a plate formed with high-precision laser cutting.

65. A rotary milking station according to claim 58, wherein the rotary milking station comprises at least one motorized-wheel assembly, the motorized-wheel assembly including a motor for selectively driving a corresponding motorized-wheel, the motorized-wheel assembly being operable between an engaged configuration where the motorized-wheel is engaged with a bottom portion of the carrousel for driving the same, and a disengaged configuration where the motorized-wheel assembly is disengaged from the carrousel.

66. A rotary milking station according to claim 65, wherein the motorized-wheel assembly is operable between the engaged and disengaged configurations via a corresponding pivot assembly.

67. A rotary milking station according to claim 66, wherein the pivot assembly is provided with a complementary assembly selected from the group consisting of suspension assembly, preload assembly, height-adjustment assembly and height-displacement assembly.

68. A rotary milking station according to claim 1, wherein the rotary milking station is a rotating milking station for milking cows.

\* \* \* \* \*